(12) United States Patent
Fukasawa et al.

(10) Patent No.: US 10,958,810 B2
(45) Date of Patent: Mar. 23, 2021

(54) DEVICE LINK PROFILE ADJUSTMENT METHOD, DEVICE LINK PROFILE ADJUSTMENT APPARATUS, AND DEVICE LINK PROFILE CREATION METHOD

(71) Applicant: SEIKO EPSON CORPORATION, Tokyo (JP)

(72) Inventors: Kenji Fukasawa, Nagano (JP); Mitsuhiro Yamashita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/162,495

(22) Filed: Oct. 17, 2018

(65) Prior Publication Data

US 2019/0124233 A1 Apr. 25, 2019

(30) Foreign Application Priority Data

Oct. 19, 2017 (JP) .............................. JP2017-202797

(51) Int. Cl.
  *G03F 3/08* (2006.01)
  *H04N 1/60* (2006.01)
  *H04N 1/54* (2006.01)

(52) U.S. Cl.
  CPC ............. *H04N 1/6025* (2013.01); *H04N 1/54* (2013.01); *H04N 1/6008* (2013.01); *H04N 1/6011* (2013.01); *H04N 1/6052* (2013.01)

(58) Field of Classification Search
  CPC combination set(s) only.
  See application file for complete search history.

(56) References Cited

U.S. PATENT DOCUMENTS

| 5,646,752 A * | 7/1997 | Kohler | G06T 11/001 358/520 |
| 6,307,961 B1 * | 10/2001 | Balonon-Rosen | G06T 11/001 345/600 |
| 7,230,737 B1 * | 6/2007 | Ohga | H04N 1/6027 358/1.9 |
| 9,013,754 B1 | 4/2015 | Sugi et al. | |

(Continued)

FOREIGN PATENT DOCUMENTS

| EP | 2933715 A1 | 10/2015 |
| JP | 2009-060475 A | 3/2009 |

(Continued)

OTHER PUBLICATIONS

The Extended European Search Report for the corresponding European Patent Application No. 18201124.7 dated Mar. 20, 2019.

*Primary Examiner* — Huo Long Chen
(74) *Attorney, Agent, or Firm* — Global IP Counselors, LLP

(57) ABSTRACT

A device link profile adjustment method of a computer carrying out a process of adjusting a device link table in a device link profile expressing a correspondence relationship between a first coordinate value of a first device-dependent color space and a second coordinate value of a second device-dependent color space, the method including: accepting an adjustment target at an adjustment point, using a coordinate in a profile connection space as a reference; and adjusting the device link table based on the adjustment target and a color conversion table including a device-independent coordinate value of the profile connection space of an original profile used to create the device link table.

19 Claims, 22 Drawing Sheets

(56) References Cited

U.S. PATENT DOCUMENTS

| | | | |
|---|---|---|---|
| 2001/0040983 A1* | 11/2001 | Nishikawa | G06T 11/001 382/109 |
| 2003/0210414 A1* | 11/2003 | Kuno | H04N 1/6052 358/1.9 |
| 2010/0086230 A1* | 4/2010 | Bala | H04N 1/603 382/276 |
| 2010/0110457 A1 | 5/2010 | Kaneko | |
| 2012/0274958 A1* | 11/2012 | Hoshino | G06K 15/1878 358/1.9 |
| 2013/0141740 A1* | 6/2013 | Shimbaru | H04N 1/603 358/1.9 |
| 2016/0239728 A1* | 8/2016 | Suzuki | H04N 1/00034 |
| 2019/0189081 A1 | 6/2019 | Fukasawa | |

FOREIGN PATENT DOCUMENTS

| | | | |
|---|---|---|---|
| JP | 5329920 B2 | 10/2013 | |
| JP | 2018-207327 A | 12/2018 | |
| JP | 2018-207328 A | 12/2018 | |
| JP | 2019-009555 A | 1/2019 | |
| JP | 2019-021977 A | 2/2019 | |
| JP | 2019-068156 A | 4/2019 | |
| JP | 2019-110444 A | 7/2019 | |

\* cited by examiner

DEVICE LINK PROFILE ADJUSTMENT METHOD, DEVICE LINK PROFILE ADJUSTMENT APPARATUS, AND DEVICE LINK PROFILE CREATION METHOD

BACKGROUND

1. Technical Field

The invention relates to techniques pertaining to creation and adjustment of device link profiles.

2. Related Art

A color management system using an International Color Consortium (ICC) profile is one system used for using an ink jet printer in the calibration of printing such as offset printing. The ICC profile is data expressing a correspondence relationship between device-dependent colors of a color device such as a printing press (for example, an offset printer) or an ink jet printer, and device-independent colors. The device-dependent colors of the printing press, the ink jet printer, and the like are expressed as coordinate values in a device-dependent color space, for example, as CMYK values expressing usage amounts of C (cyan), M (magenta), Y (yellow), and K (black). The device-independent colors are expressed as, for example, color values in Commission Internationale de l'Eclairage (CIE: the International Commission on Illumination)) L*a*b* color space (abbreviated as Lab values, omitting the "*"), color values in a CIE XYZ color space, and the like, which are device-independent color spaces.

Here, the ICC profile of the printing press is assumed as an input profile and the ICC profile of the ink jet printer is assumed as an output profile. If the CMYK values of the printing press are converted into color values (e.g., Lab values) in a Profile Connection Space (PCS) in accordance with the input profile, those color values can be converted into CMYK values of the ink jet printer (called cmyk values) in accordance with the output profile. A device link profile obtained by combining an A2B table (a table for converting from CMYK values to Lab values) of an input profile and a B2A table (a table for converting from Lab values to cmyk values) of an output profile is sometimes used during printing. The device link profile expresses the correspondence relationship between the CMYK values of the printing press and the cmyk values of the ink jet printer. When the ink jet printer prints using the cmyk values, the ink jet printer can reproduce colors close to the colors of the printing press. In practice, however, there are cases where expected colors cannot be reproduced, due to profile error, color measurement error, fluctuations in the printer, and the like. In such a case, spot color adjustment is carried out, where an adjustment point expressing a spot color to be adjusted is designated, an adjustment target of the adjustment point is designated, and the ICC profile is modified based on the adjustment target.

JP-A-2009-60475 discloses a technique in which a device link profile is created by combining an input-side profile and an output-side profile.

When a color chart containing a spot color patch is printed by the ink jet printer, and the spot color patch that has been formed is measured by a colorimetric device, the pre-adjustment measurement values (PCS values) can be obtained. Additionally, when a color chart containing the spot color patch is printed by the printing press, and the formed spot color patch is measured, a target colorimetric value can be obtained. In this case, it is conceivable to feed the adjustment target back into the ICC profile using coordinates in PCS as a reference.

However, although the device link profile contains input-side CMYK values and output-side cmyk values, the device link profile does not contain PCS values. Thus, when carrying out spot color adjustment on a device link profile that has already been created, an adjustment target based on PCS coordinates cannot be fed back into the device link profile.

Note that this issue is not limited to the adjustment of device link profiles for ink jet printers, and also arises when adjusting the device link profiles of a variety of color devices.

An advantage of some aspects of the invention is to provide a technique that makes it easy to adjust a device link profile.

SUMMARY

To achieve one of the above-described advantages, the invention has as one aspect a device link profile adjustment method of a computer carrying out a process of adjusting a device link table in a device link profile expressing a correspondence relationship between a first coordinate value of a first device-dependent color space and a second coordinate value of a second device-dependent color space, the method including: accepting an adjustment target at an adjustment point, using a coordinate in a profile connection space as a reference, and adjusting the device link table based on the adjustment target and a color conversion table including a device-independent coordinate value of the profile connection space of an original profile used to create the device link table.

Additionally, the invention has as another aspect a device link profile adjustment program that causes a computer to execute functions corresponding to the steps of the above-described device link profile adjustment method.

Furthermore, the invention has as another aspect a device link profile adjustment apparatus including units corresponding to the steps of the above-described device link profile adjustment method.

Further still, the invention has as another aspect a device link profile adjustment system including units corresponding to the steps of the above-described device link profile adjustment method.

Furthermore, the invention has as another aspect a device link profile creation method of a computer carrying out a process of creating a device link profile including a device link table expressing a correspondence relationship between a first coordinate value of a first device-dependent color space and a second coordinate value of a second device-dependent color space, the method including: generating a device link table associating the first coordinate value in an input profile expressing a correspondence relationship between the first coordinate value and a device-independent coordinate value of a profile connection space with the second coordinate value in an output profile expressing a correspondence relationship between the device-independent coordinate value and the second coordinate value, and storing a color conversion table of at least one of the input profile and the output profile in a private tag of the device link profile.

Additionally, the invention has as another aspect a device link profile creation program that causes a computer to execute functions corresponding to the steps of the above-described device link profile creation method.

Furthermore, the invention has as another aspect a device link profile creation apparatus including units corresponding to the steps of the above-described device link profile creation method.

The above-described aspects can provide a technique that makes it easy to adjust a device link profile.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
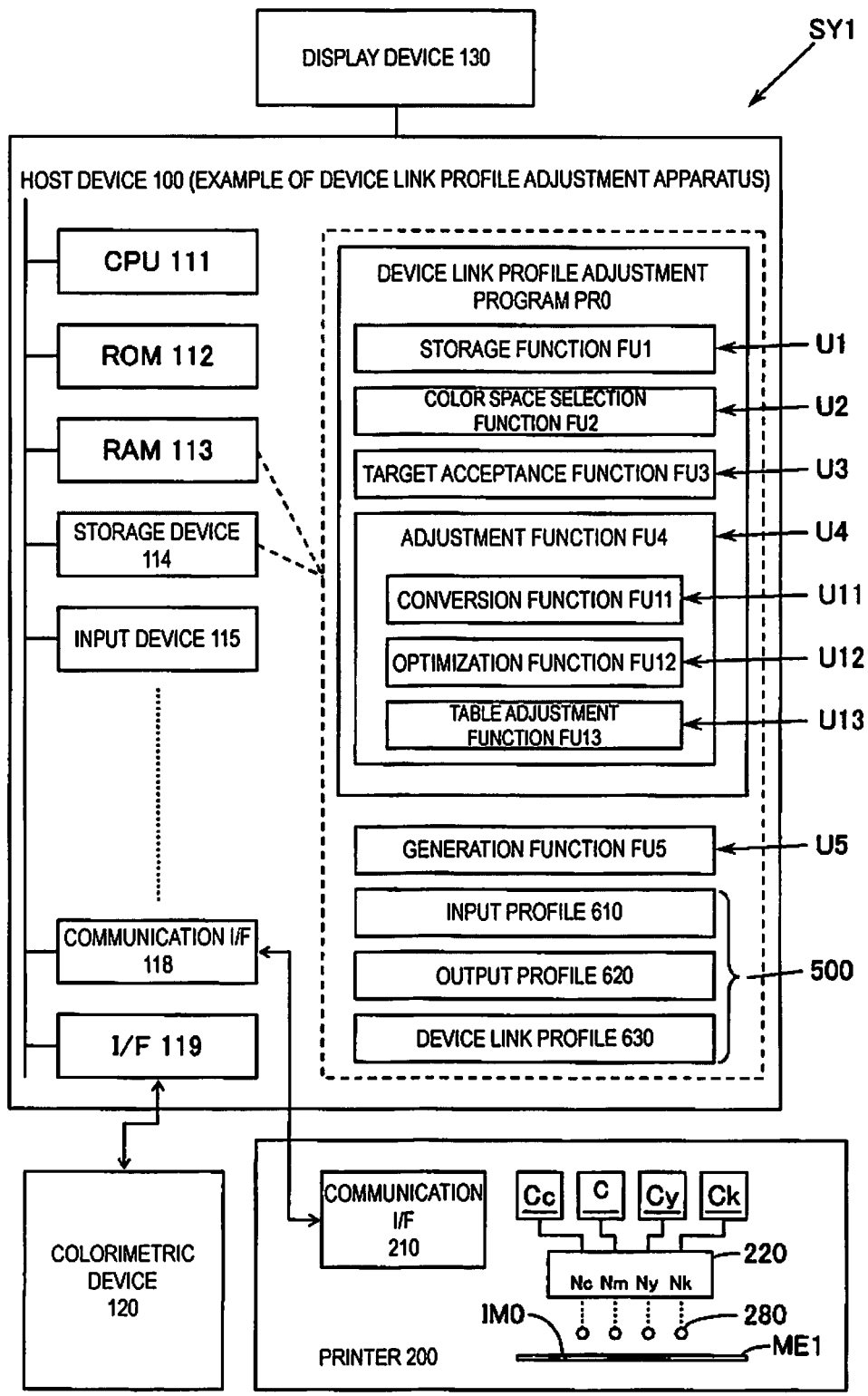
FIG. 1 is a block diagram schematically illustrating an example of the configuration of a device link profile adjustment system.

Exemplary embodiments of the invention will be described hereinafter. Of course, the following exemplary embodiments are merely examples of the invention, and not all of the characteristics described in the exemplary embodiments are required to address the issue discussed in the invention.

(1) Overview of Technique Described in Invention:

First, an overview of the technique described in the invention will be given with reference to the examples illustrated in FIGS. 1 to 22. Note that the drawings in this application are drawings schematically illustrating examples. The scales in the directions indicated in the drawings may differ, and the drawings may not match with each other. Of course, elements according to this technique are not limited to specific examples indicated by reference signs.

Aspect 1

As illustrated in FIGS. 2, 6 to 12, and the like, a device link profile adjustment method according to one aspect of this technique is a device link profile adjustment method of a computer (e.g., a host device 100) carrying out a process of adjusting a device link table 631 of a device link profile 630, and includes a target acceptance step ST3 and an adjustment step ST4. Here, the device link profile 630 expresses a correspondence relationship between first coordinate values (e.g., CMYK values) in a first device-dependent color space CS1 (e.g., a CMYK color space) and second coordinate values (e.g., cmyk values) in a second device-dependent color space CS2 (e.g., a cmyk color space). In the target acceptance step ST3, an adjustment target T0 at an adjustment point P0, which takes coordinates in a profile connection space CS3 (e.g., a Lab color space) as a reference, is accepted. In the adjustment step ST4, the device link table 631 is adjusted based on the adjustment target T0 and a color conversion table (e.g., an A2B table 622) including device-independent coordinate values (e.g., Lab values) of the profile connection space CS3 in an original profile (e.g., an output profile 620) used to create the device link table 631.

The color conversion table of the original profile used to create the device link table 631 includes the device-independent coordinate values (Lab values) of the profile connection space CS3, and thus the device link table 631 can be adjusted using the coordinates in the profile connection space CS3 as a reference. Accordingly, this aspect can provide a device link profile adjustment method that makes it easy to adjust a device link profile.

Here, the profile connection space includes color spaces such as the CIE Lab color space, the CIE XYZ color space, and the like.

The first device-dependent color space includes the CMYK color space, the CMY color space, the RGB color space, and the like. Note that R stands for red, G for green, and B for blue.

The second device-dependent color space includes the CMYK color space, the CMY color space, the RGB color space, and the like. In the exemplary embodiments described below, when the second device-dependent color space is the CMYK color space, the second device-dependent color space will be referred to as a cmyk color space to distinguish the color space from the CMYK color space corresponding to the first device-dependent color space.

The adjustment target at the adjustment point may be expressed as coordinate values in a color space, or may be expressed as a difference from current coordinate values in the color space.

The original profile includes an input profile expressing a correspondence relationship between the first coordinate values and the device-independent coordinate values, and an output profile expressing a correspondence relationship between the device-independent coordinate values and the second coordinate values.

The color conversion table of the original profile includes a conversion table used to convert from device-dependent color space coordinate values to device-independent coordinate values, and a conversion table used to convert from device-independent coordinate values to device-dependent color space coordinate values.

Note that the additional remarks made above in Aspect 1 also apply to the other aspects.

Aspect 2

Figure 2:
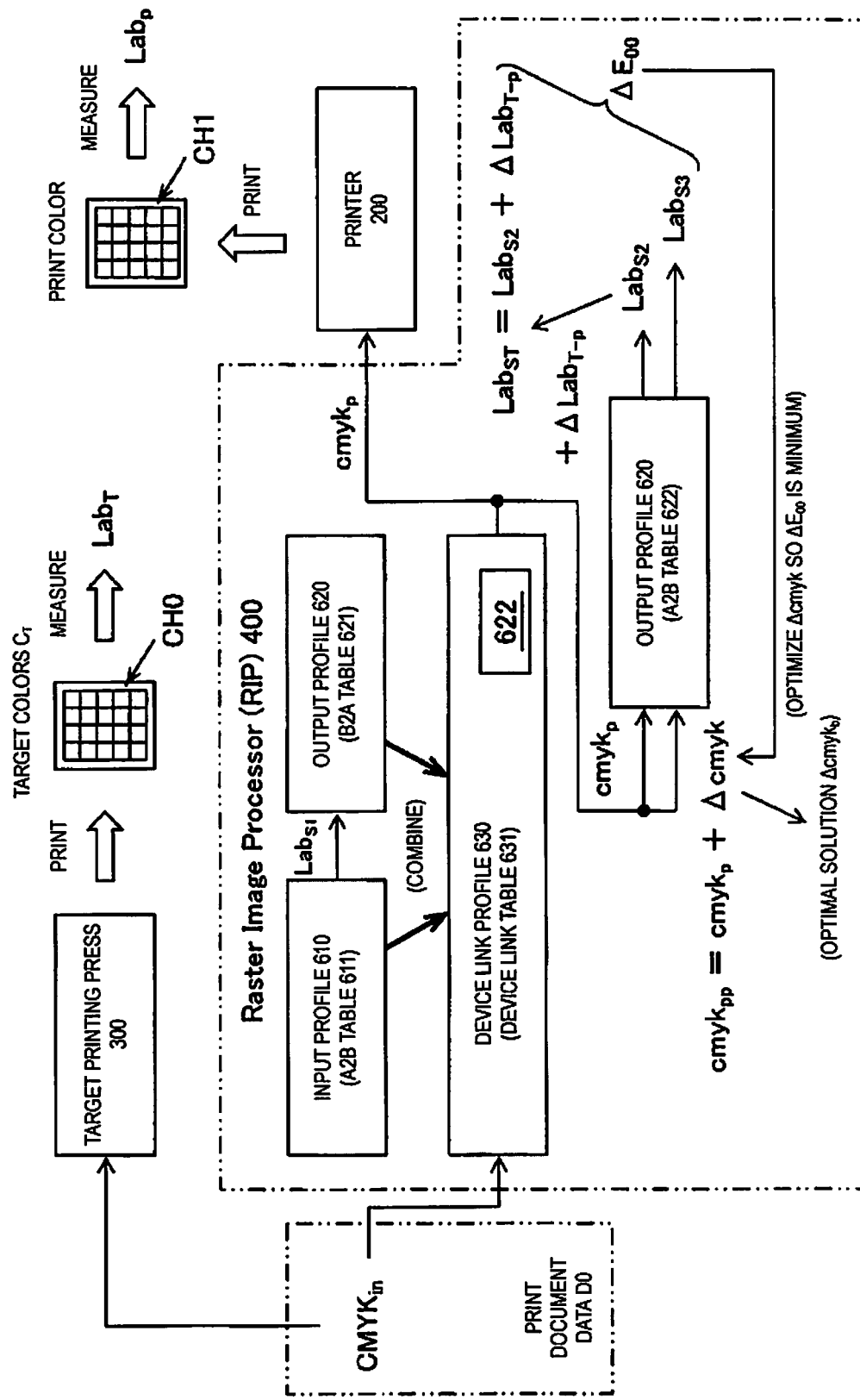
FIG. 2 is a diagram schematically illustrating an example of a color management flow.
Figure 8:
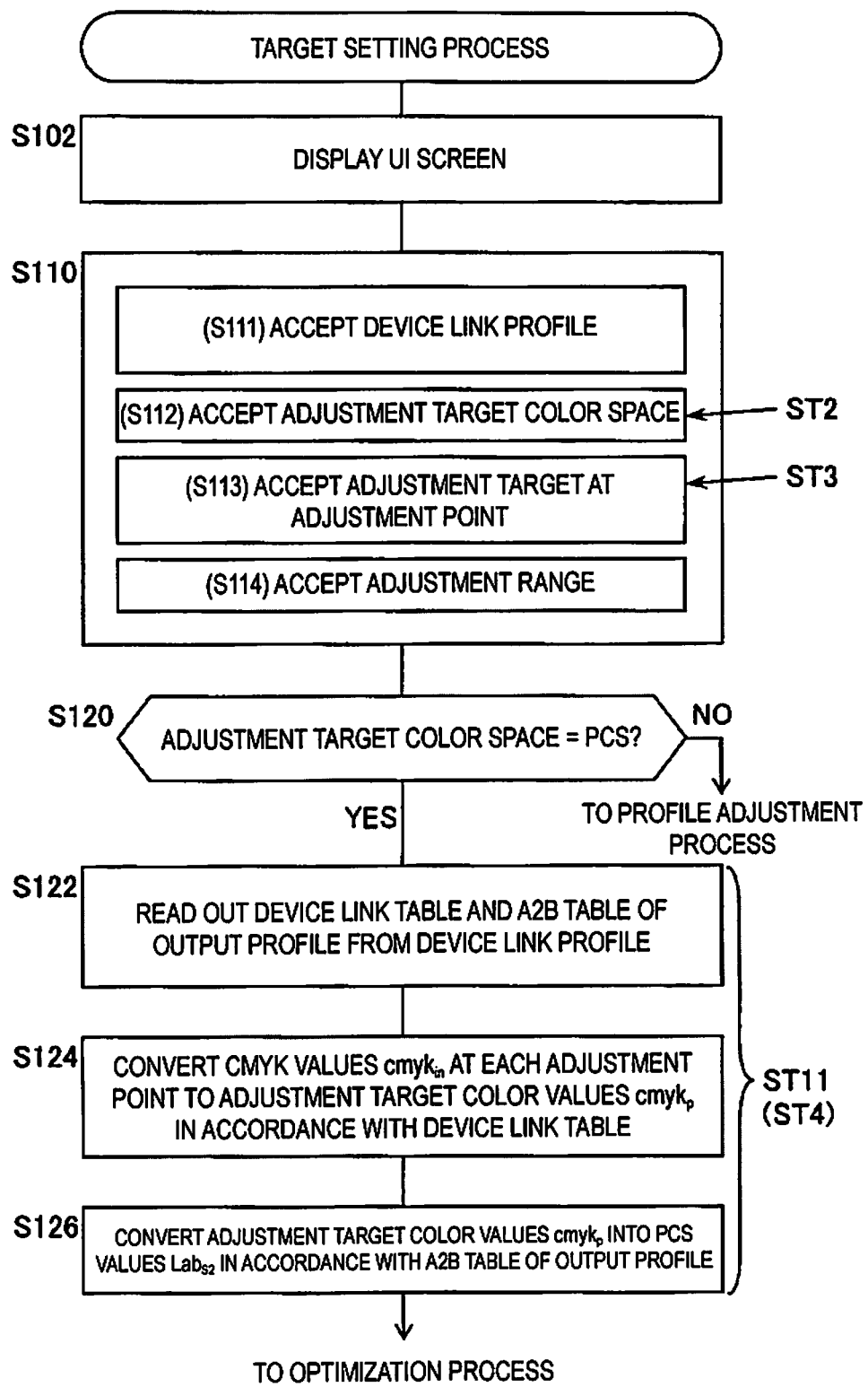
FIG. 8 is a flowchart illustrating an example of a target setting process.
Figure 10:
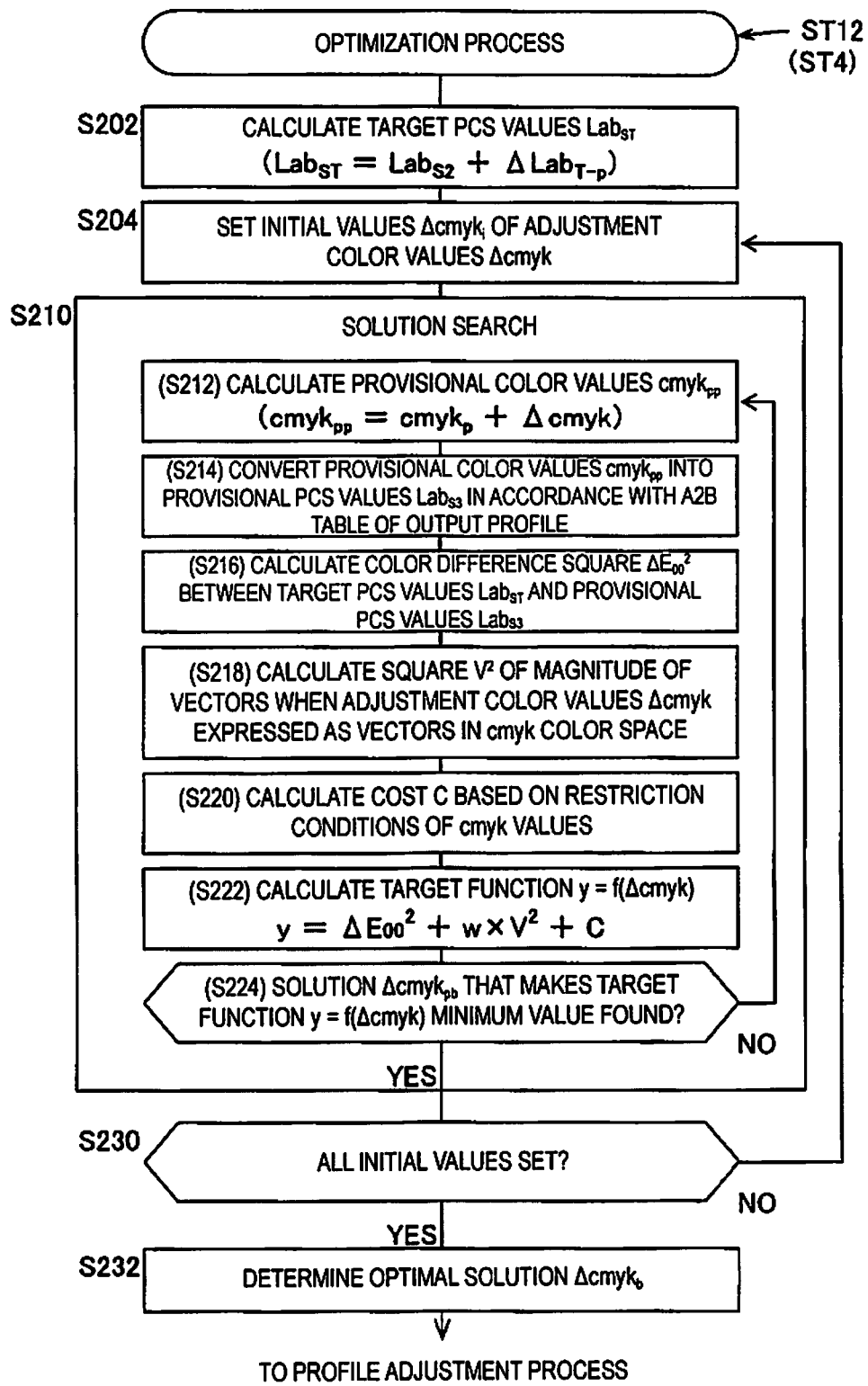
FIG. 10 is a flowchart illustrating an example of an optimization process.

As illustrated in FIGS. 2, 8, and 10, the original profile may include the output profile 620, which expresses a correspondence relationship between the second coordinate values (e.g., cmyk values) and the device-independent coordinate values (e.g., Lab values). The color conversion table may include a first conversion table (e.g., the A2B table 622) used to convert from the second coordinate values (cmyk values) to the device-independent coordinate values (Lab values). This aspect can provide a favorable technique for adjusting a device link profile.

Aspect 3

As illustrated in FIGS. 2, 8, and 10, the adjustment step ST4 may include a conversion step ST11 of converting adjustment target color values (e.g., $cmyk_p$), which are the second coordinate values at the adjustment point P0, into adjustment target PCS values (e.g., $Lab_{S2}$), which are the device-independent coordinate values, in accordance with the first conversion table (e.g., the A2B table 622). Here, values obtained by adding relative values of the adjustment target T0 using the coordinates in the profile connection space CS3 as a reference (for example, $\Delta Lab_{T\text{-}p}$) to the adjustment target PCS values ($Lab_{S2}$) are assumed as target PCS values (for example, $Lab_{ST}$). Additionally, values added to the adjustment target color values ($cmyk_p$) for matching the adjustment target T0 are taken as adjustment color values (e.g., $\Delta cmyk$). The adjustment step ST4 may include an optimization step ST12, in which provisional color values (e.g., $cmyk_{pp}$) obtained by adding the adjustment color values ($\Delta cmyk$) to the adjustment target color values ($cmyk_p$) are converted in accordance with the first conversion table (622) to obtain provisional PCS values (e.g., $Lab_{S3}$), the provisional PCS values are subjected to an optimization process including an element for bringing the provisional PCS values closer to the target PCS values ($Lab_{ST}$), and an optimal solution (e.g., $\Delta cmyk_b$) of the adjustment color values ($\Delta cmyk$) is obtained as a result. Furthermore, the adjustment step ST4 may include a table adjustment step ST13 of adjusting the device link table 631 based on the optimal solution ($\Delta cmyk_b$) of the adjustment color values ($\Delta cmyk$).

The adjustment target color values ($cmyk_p$) express output colors of a second device (e.g., a printer 200), which has the second device-dependent color space CS2. The adjustment target PCS values ($Lab_{S2}$) obtained from the adjustment target color values ($cmyk_p$) in accordance with the first conversion table (622) of the output profile 620 are device-independent coordinate values expressing the output colors of the second device (200). Values obtained by adding the relative values ($\Delta Lab_{T\text{-}p}$) of the adjustment target T0 using the coordinates in the profile connection space CS3 as a reference to the adjustment target PCS values ($Lab_{S2}$), are the target PCS values ($Lab_{ST}$). According to this aspect, the device link profile 630 is adjusted based on the optimal solution ($\Delta cmyk_b$) of the adjustment color values ($\Delta cmyk$) obtained through the optimization process, which includes an element for bringing the provisional PCS values ($Lab_{S3}$) closer to the target PCS values ($Lab_{ST}$), and thus an adjustment result in the output colors of the second device (200) is closer to the intended color.

Accordingly, this aspect can provide a technique that further improves the color reproduction accuracy of the device link profile.

Here, an optimization process using a quasi-Newton method, an optimization process using a Newton method, an optimization process using a conjugate gradient method, and the like can be used as the optimization process.

Obtaining an optimal solution through the optimization process includes determining an optimal solution from among a plurality of solutions obtained by carrying out a plurality of optimization processes, and obtaining an optimal solution from a single optimization process.

Note that the additional remarks made above in Aspect 3 also apply to the other aspects.

Aspect 4

Figure 19:
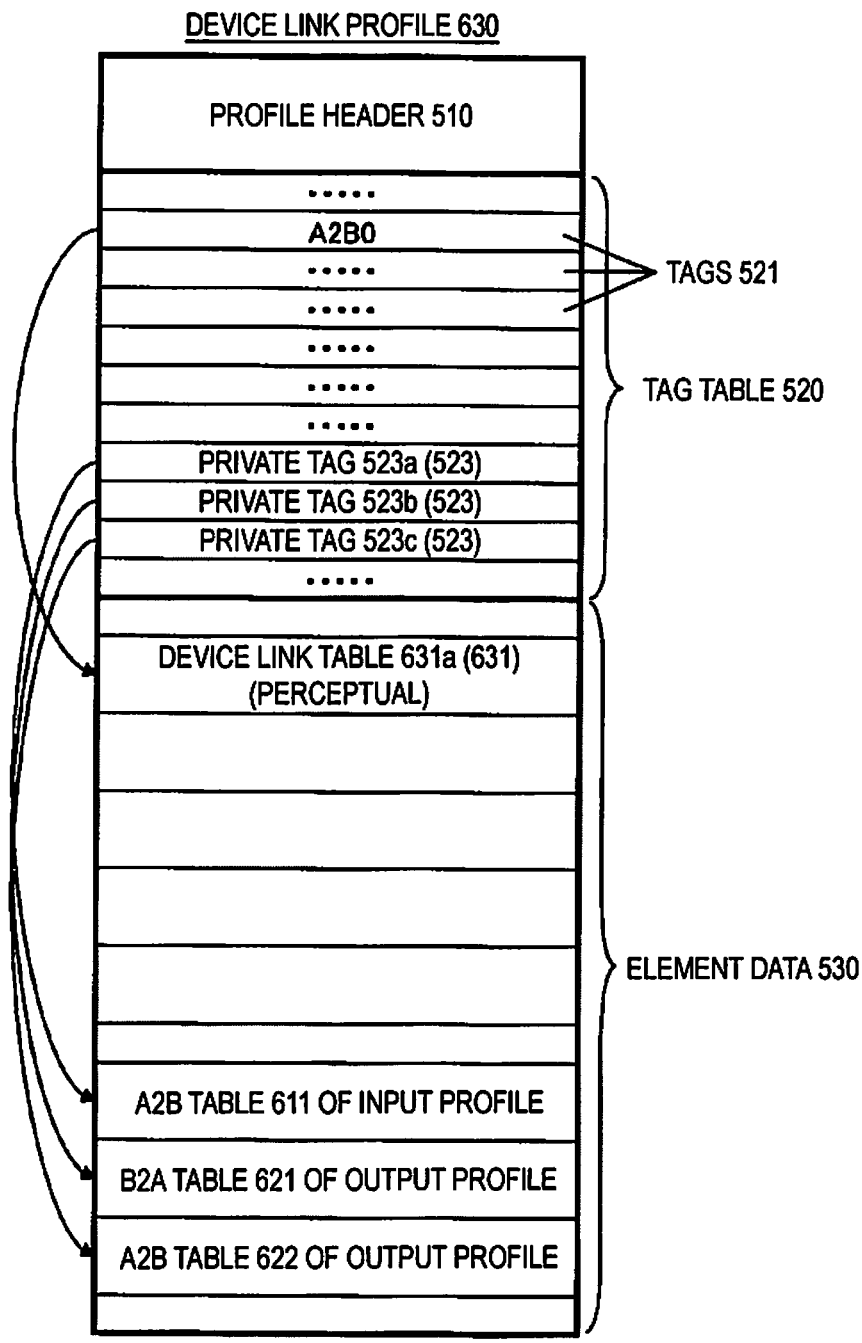
FIG. 19 is a diagram schematically illustrating another example of the structure of a device link profile.

As illustrated in FIG. 19, the original profile may include an input profile 610, which expresses a correspondence relationship between the first coordinate values (e.g., CMYK values) and the device-independent coordinate values (e.g., Lab values), and an output profile 620, which expresses a correspondence relationship between the device-independent coordinate values (Lab values) and the second coordinate values (e.g., cmyk values). The color conversion table may include a second conversion table (e.g., an A2B table 611) used to convert from the first coordinate values (CMYK values) to the device-independent coordinate values (Lab values) in the input profile 610, and a third conversion table (e.g., a B2A table 621) used to convert from the device-independent coordinate values (Lab values) to the second coordinate values (cmyk values) in the output profile 620. This aspect, too, can provide a favorable technique for adjusting the device link profile.

Aspect 5

Figure 6:
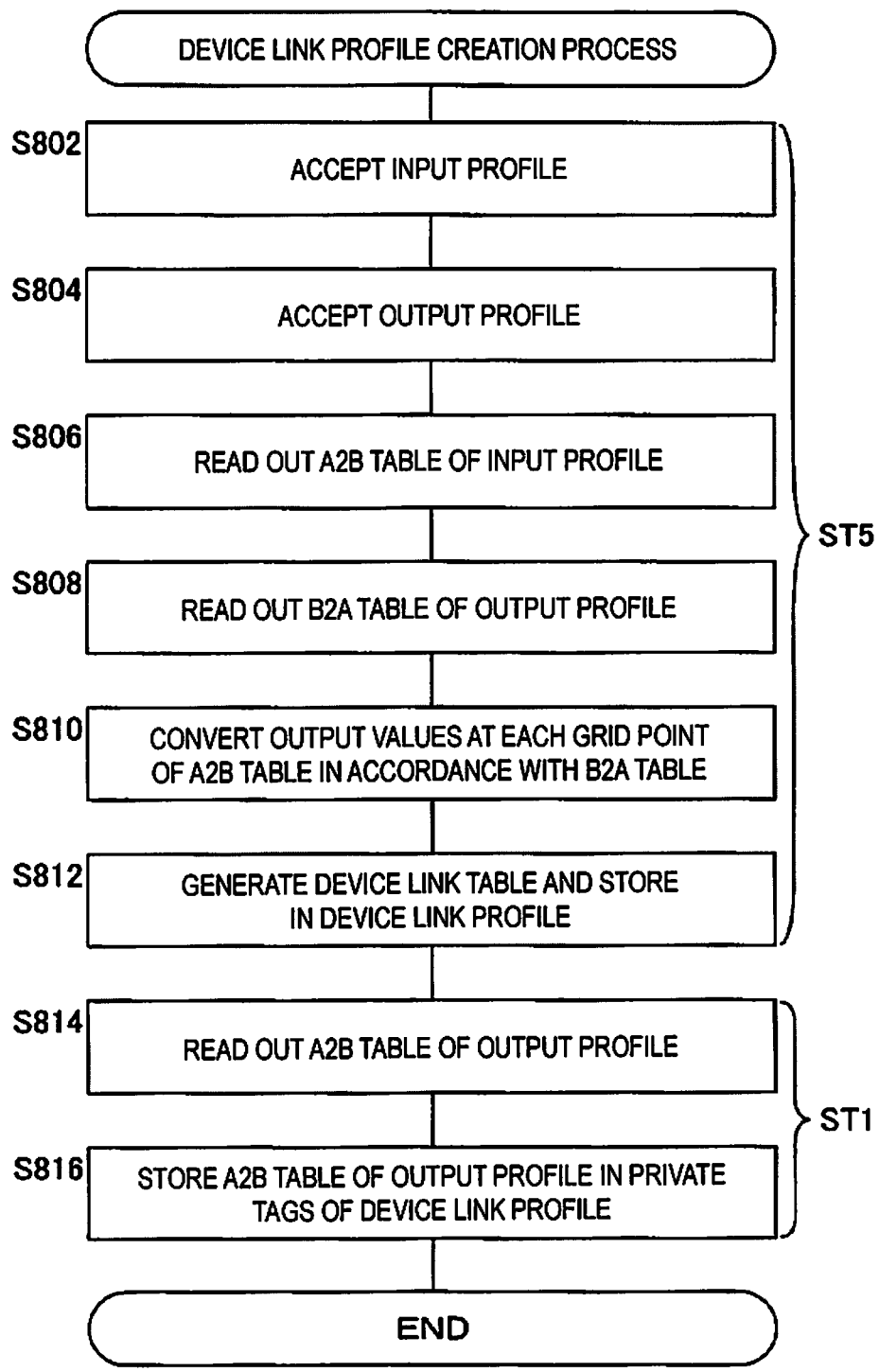
FIG. 6 is a flowchart illustrating an example of a device link profile creation process.
Figure 12:
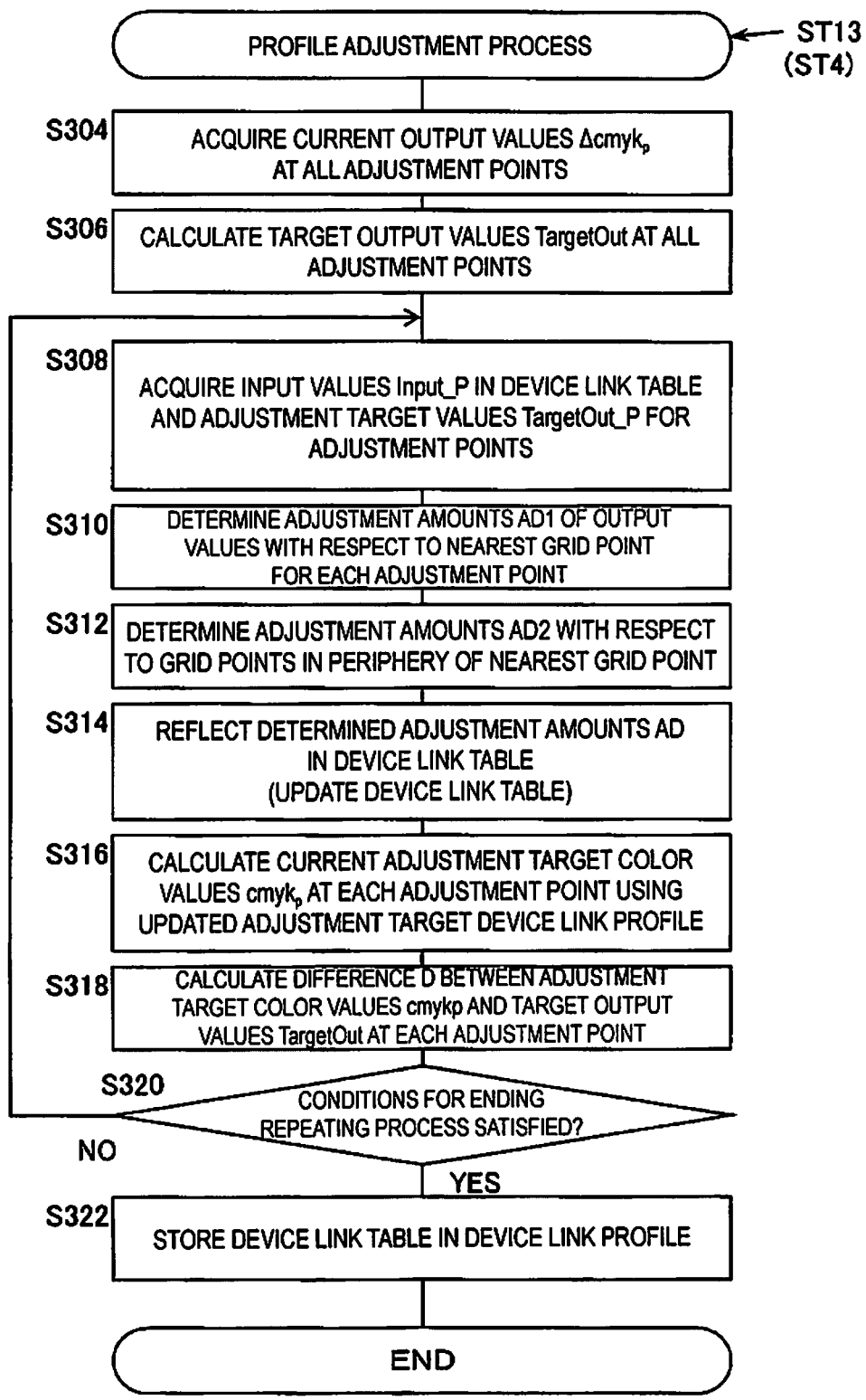
FIG. 12 is a flowchart illustrating an example of a profile adjustment process.

As illustrated in FIG. 6, the device link profile adjustment method may further include a storage step ST1 of storing the color conversion table in private tags 523 of the device link profile 630. As illustrated in FIG. 8 and the like, in the adjustment step ST4, the color conversion table may be read out from the private tags 523 of the device link profile 630. Additionally, as illustrated in FIGS. 10, 12, and the like, in the adjustment step ST4, the device link table 631 may be adjusted based on the read-out color conversion table and the adjustment target T0.

In Aspect 5, the color conversion table of the original profile is stored in the private tags 523 of the device link profile 630, and thus the relationship between the device link table 631 and the color conversion table in the original profile is maintained, which helps prevent needing to redo the adjustment task due to operational mistakes. Accordingly, this aspect can provide a technique that further improves the convenience of the device link profile adjustment task.

Aspect 6

Figure 16:
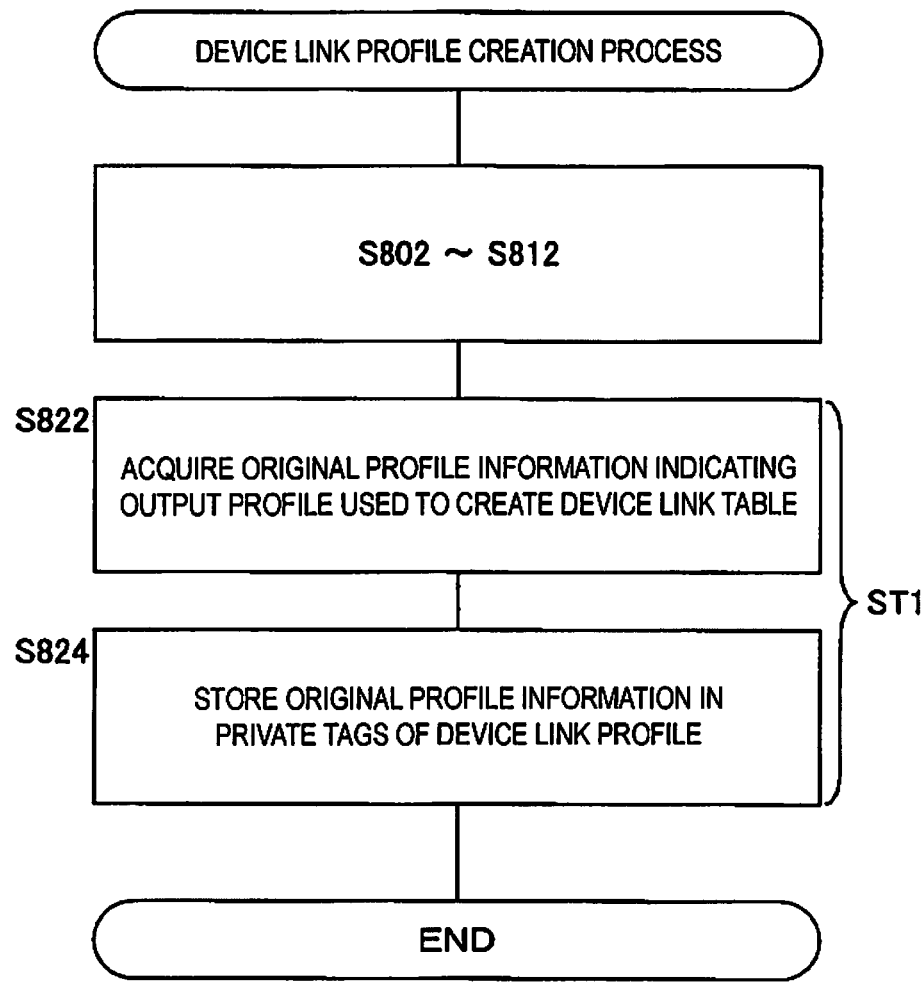
FIG. 16 is a flowchart illustrating another example of a device link profile creation process.
Figure 18:
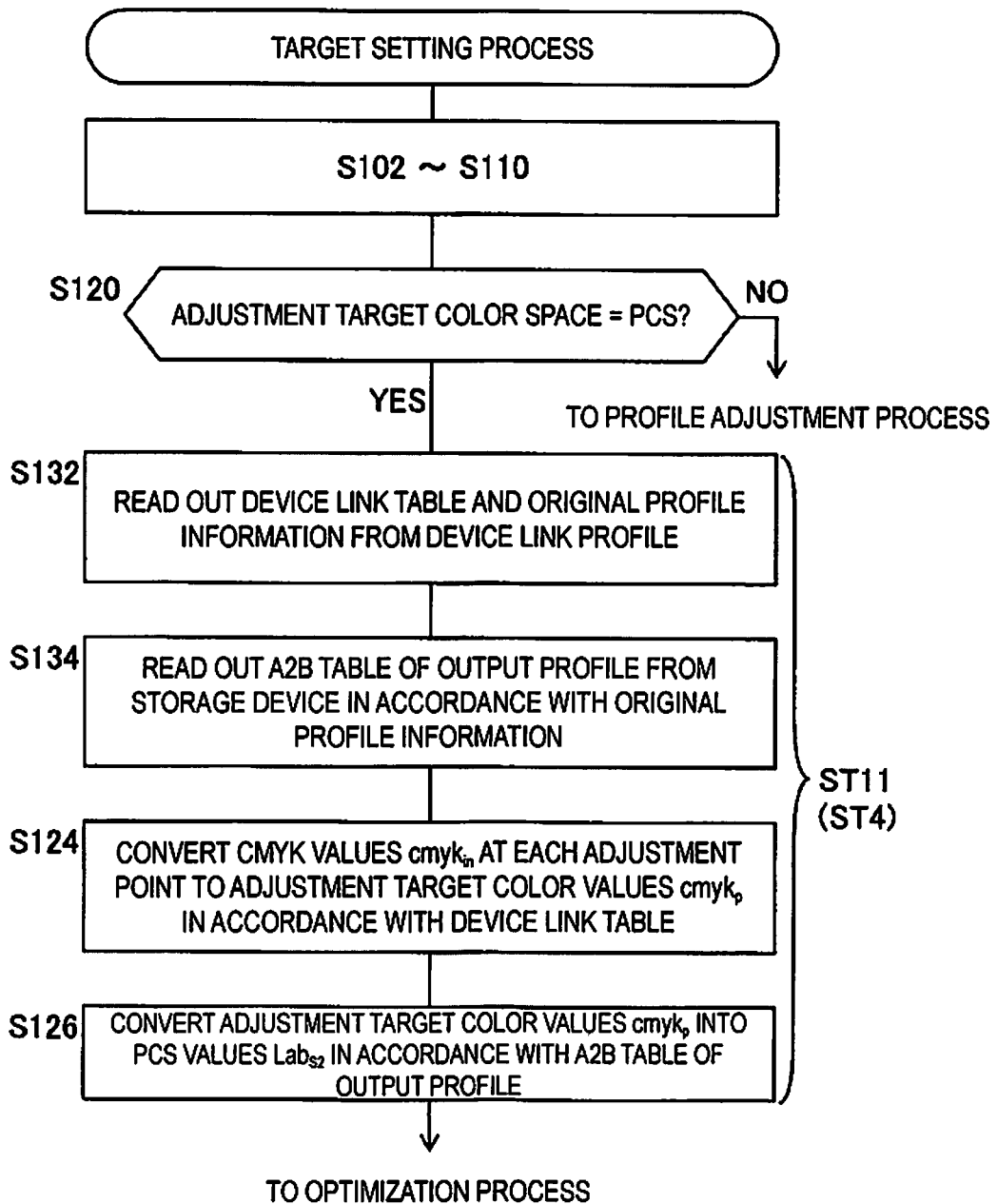
FIG. 18 is a flowchart illustrating another example of a target setting process.

As illustrated in FIG. 16, the device link profile adjustment method may further include a storage step ST1 of storing original profile information 635 indicating the original profile in the private tags 523 of the device link profile 630. As illustrated in FIG. 18, in the adjustment step ST4, the original profile information 635 may be read out from the private tags 523 of the device link profile 630. Additionally, in the adjustment step ST4, the device link table 631 may be adjusted based on the color conversion table of the original profile indicated by the read-out original profile information 635, and the adjustment target T0.

In Aspect 6, the original profile information 635 indicating the original profile is stored in the private tags 523 of the device link profile 630, and thus the relationship between the device link table 631 and the original profile is maintained, which helps prevent needing to redo the adjustment task due to operational mistakes. Accordingly, this aspect can provide a technique that further improves the convenience of the device link profile adjustment task.

Aspect 7

A device link profile adjustment method according to another aspect of this technique is a device link profile adjustment method of a computer (e.g., the host device 100) carrying out a process of adjusting the device link table 631 of the device link profile 630, and includes a color space selection step ST2, a target acceptance step ST3, and an adjustment step ST4. In the color space selection step ST2, at least one of the first device-dependent color space CS1 and the second device-dependent color space CS2, and the profile connection space CS3, is accepted as an adjustment target color space CS6. In the target acceptance step ST3, the adjustment target T0 at the adjustment point P0, which takes coordinates in the adjustment target color space CS6 as a reference, is accepted. In the adjustment step ST4, when the adjustment target color space CS6 is one of the first device-dependent color space CS1 and the second device-dependent color space CS2, the device link table 631 of the device link profile 630 is taken as a target, and the device link table 631 may be adjusted based on the adjustment target T0. In the adjustment step ST4, when the adjustment target color space CS6 is the profile connection space CS3, the device link table 631 may be adjusted based on the adjustment target T0 and a color conversion table (e.g., the A2B table 622) including the device-independent coordinate values (e.g., Lab values) of the profile connection space CS3 in an original profile (e.g., the output profile 620) used to create the device link table 631.

In Aspect 7, the adjustment target for the coordinate values of the device link profile 630 can be selected from at least one of the first device-dependent color space CS1 and the second device-dependent color space CS2, and, the profile connection space CS3. Accordingly, this aspect can provide a technique that can further improve the convenience of the device link profile adjustment task.

Aspect 8

Incidentally, a device link profile adjustment program PR0 according to one aspect of this technique causes a computer (e.g., the host device 100) to implement a target acceptance function FU3 corresponding to the target acceptance step ST3 and an adjustment function FU4 corresponding to the adjustment step ST4. Accordingly, this aspect can provide a device link profile adjustment program that makes it easy to adjust the device link profile. The adjustment function FU4 may include a conversion function FU11 corresponding to the conversion step ST11, an optimization function FU12 corresponding to the optimization step ST12, and a table adjustment function FU13 corresponding to the table adjustment step ST13. The device link profile adjustment program PR0 may cause a computer (e.g., the host device 100) to execute a storage function FM corresponding to the storage step ST1 and a color space selection function FU2 corresponding to the color space selection step ST2.

Aspect 9

A device link profile adjustment apparatus (e.g., the host device 100) according to an aspect of this technique includes a target acceptance unit U3 corresponding to the target acceptance step ST3 and an adjustment unit U4 corresponding to the adjustment step ST4. Accordingly, this aspect can provide a device link profile adjustment apparatus (100) that makes it easy to adjust a device link profile. The adjustment unit U4 may include a conversion unit U11 corresponding to the conversion step ST11, an optimization unit U12 corresponding to the optimization step ST12, and a table adjustment unit U13 corresponding to the table adjustment step ST13. The device link profile adjustment apparatus (100) may include a storage unit U1 corresponding to the storage step ST1 and a color space selection unit U2 corresponding to the color space selection step ST2.

Aspect 10

Furthermore, a device link profile adjustment system SY1 according to an aspect of this technique includes a printing apparatus (e.g., the printer 200) configured to print a color chart including a patch, a colorimetric device 120 configured to measure the patch, and the units of Aspect 9. This aspect can provide a device link profile adjustment system that makes it easy to adjust a device link profile. The adjustment unit U4 may include the conversion unit U11, the optimization unit U12, and the table adjustment unit U13. The device link profile adjustment system SY1 may include the storage unit U1 and the color space selection unit U2.

Aspect 11

Figure 3:
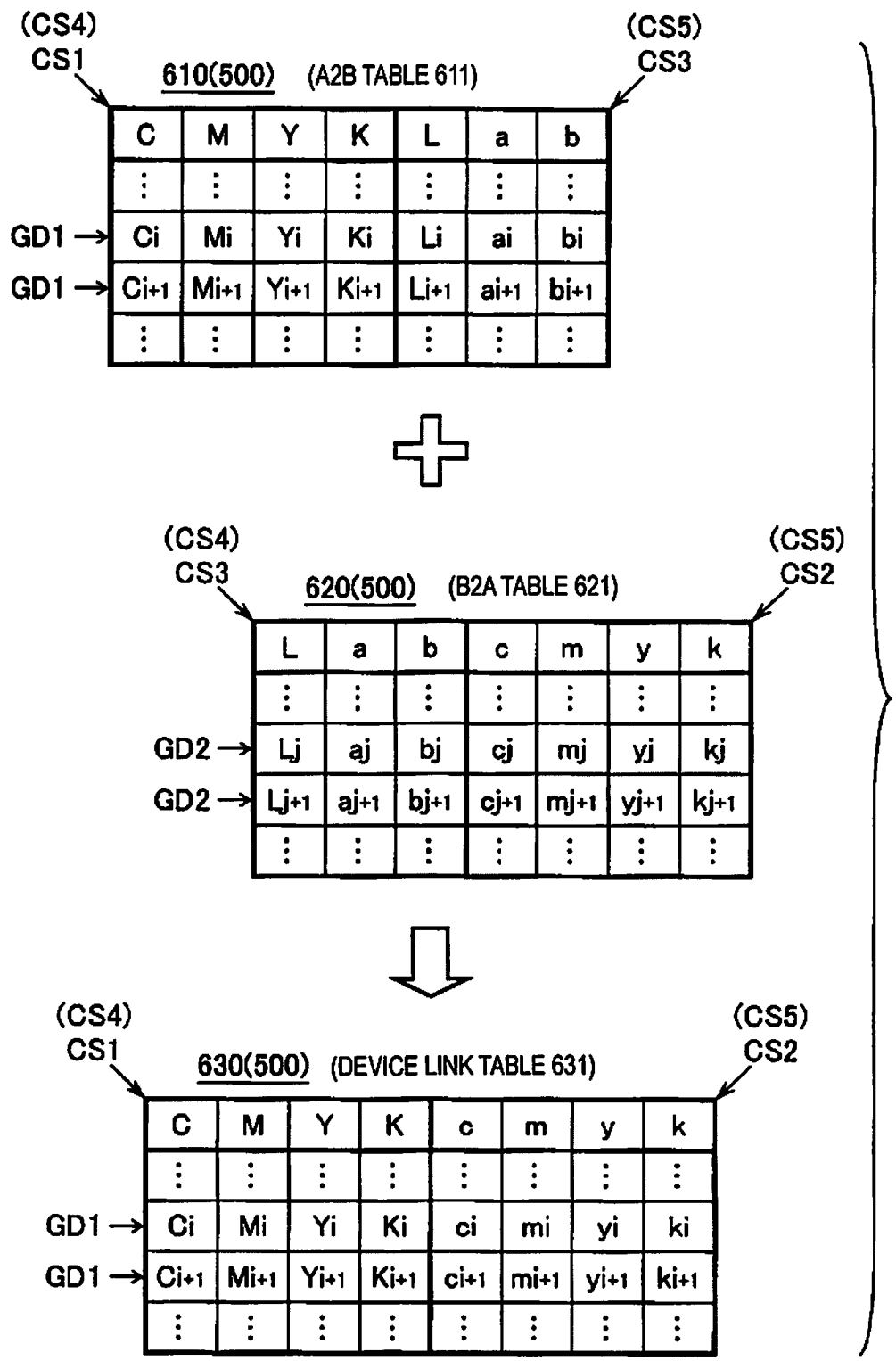
FIG. 3 is a diagram schematically illustrating an example of relationships between various profiles.
Figure 7:
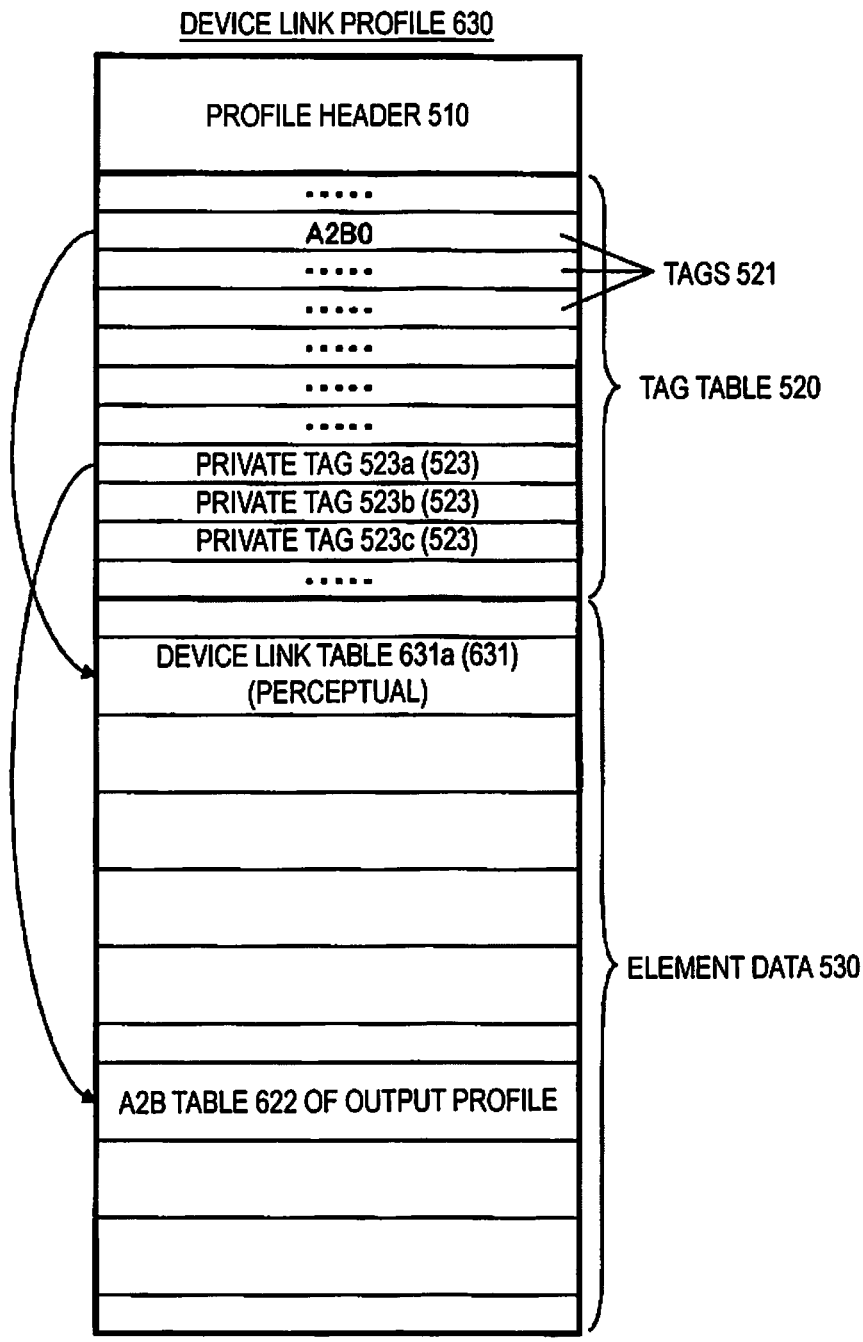
FIG. 7 is a diagram schematically illustrating an example of the structure of a device link profile.

Furthermore, as illustrated in FIGS. 3, 6, 7, and the like, a device link profile creation method according to an aspect of this technique is a device link profile creation method of a computer (e.g., the host device 100) carrying out a process of creating the device link profile 630 including the device link table 631 expressing the correspondence relationship between the first coordinate values (e.g., CMYK values) of the first device-dependent color space CS1 (e.g., the CMYK color space) and the second coordinate values (e.g., cmyk values) of the second device-dependent color space CS2 (e.g., the cmyk color space), and includes a generation step ST5 and a storage step ST1. In the generation step ST5, the device link table 631 is generated with the first coordinate values (CMYK values) in the input profile 610 expressing a correspondence relationship between the first coordinate values (CMYK values) and the device-independent coordinate values (e.g., Lab values) of the profile connection space CS3 (e.g., the Lab color space) being associated with the second coordinate values (cmyk values) in the output profile 620 expressing a correspondence relationship between the device-independent coordinate values (Lab values) and the second coordinate values (cmyk values). In the storage step ST1, a color conversion table (e.g., the A2B table 622) in at least one of the input profile 610 and the output profile 620 is stored in the private tags 523 of the device link profile 630.

The color conversion table of the original profile (at least one of the input profile 610 and the output profile 620) used to create the device link table 631 includes the device-independent coordinate values (Lab values) of the profile connection space CS3, and thus the device link table 631 can be adjusted using the coordinates in the profile connection space CS3 as a reference. Accordingly, this aspect can provide a device link profile creation method that makes it easy to adjust a device link profile.

Aspect 12

Additionally, a device link profile creation program according to an aspect of this technique causes a computer (e.g., the host device 100) to execute a generation function FU5 corresponding to the generation step ST5 and a storage function FU1 corresponding to the storage step ST1. This aspect can provide a device link profile creation program that makes it easy to adjust a device link profile.

Aspect 13

Furthermore, a device link profile creation apparatus (e.g., the host device 100) according to an aspect of this technique includes a generation unit U5 corresponding to the generation step ST5 and a storage unit U1 corresponding to the storage step ST1. This aspect can provide a device link profile creation apparatus (100) that makes it easy to adjust a device link profile.

This technique can furthermore be applied to a control method of a device link profile adjustment apparatus, a multifunction system including a device link profile adjustment apparatus, a control method of the multifunction system, a control program of a device link profile adjustment apparatus, a control program of the multifunction system, a control method of a device link profile creation apparatus, a multifunction system including a device link profile creation apparatus, a control method of the multifunction system, a control program of a device link profile creation apparatus, a control program of the multifunction system, a computer-readable medium in which is recorded a device link profile adjustment program, a device link profile creation program, the control program, and the like. The above-described apparatuses may include a plurality of separate parts.

(2) Specific Example of Configuration of Device Link Profile Adjustment System:

FIG. 1 schematically illustrates an example of the configuration of a device link profile adjustment system including a device link profile creation apparatus and a device link profile adjustment apparatus. The device link profile adjustment system SY1 illustrated in FIG. 1 includes the host device 100 (an example of a device link profile creation apparatus and a device link profile adjustment apparatus), a display device 130, the colorimetric device 120, and an ink jet printer 200. In the host device 100, a central processing unit (CPU) 111, a read only memory (ROM) 112, a random access memory (RAM) 113, a storage device 114, an input device 115, a communication interface (I/F) 118, a colorimetric device I/F 119, and the like are connected so as to be capable of inputting/outputting information to/from each other. Note that the ROM 112, the RAM 113, and the storage device 114 are memories, and at least the ROM 112 and the RAM 113 are semiconductor memories. A liquid-crystal display panel and the like can be used as the display device 130.

The storage device 114 stores an operating system (OS; not illustrated), the device link profile adjustment program PR0, a device link profile creation program, and the like. These are loaded into the RAM 113 and used in processing for creating the device link profile 630, processing for adjusting the device link profile 630, and the like. Here, "profiles 500" in FIG. 1 collectively refers to the input profile 610, the output profile 620, and the device link profile 630. Various types of information, for example, the input profile 610, the output profile 620, the device link profile 630, an adjustment history (not illustrated), and the like, are stored in at least one of the RAM 113 and the storage device 114. Non-volatile semiconductor memory such as flash memory, a magnetic storage device such as a hard disk, and the like can be used as the storage device 114.

A pointing device, hardware keys including a keyboard, a touch panel affixed to a surface of a display panel, and the like can be used as the input device 115. The communication I/F 118 is connected to a communication I/F 210 of the printer 200, and inputs/outputs information such as print data to/from the printer 200. The colorimetric device I/F 119 is connected to the colorimetric device 120, and obtains colorimetric data, including colorimetric values, from the colorimetric device 120. Universal Serial Bus (USB), a near-field wireless communication standard, and the like can be used as the standard of the I/Fs 118, 119, and 210. The communication through the communication I/Fs 118, 119, and 210 may be wired communication, may be wireless communication, or may be network communication over a local area network (LAN), the Internet, and the like.

The colorimetric device 120 can measure each color patch formed on a print substrate, which is an example of a medium on which a color chart is formed, and output colorimetric values. The patch is also called a "color chart". The colorimetric values are values expressed as a lightness L and chromaticity coordinates a and b in the CIE Lab color space, for example. The host device 100 obtains the colorimetric data from the colorimetric device 120 and carries out various processes.

The device link profile adjustment program PR0 illustrated in FIG. 1 causes the host device 100 to implement the storage function FU1, the color space selection function FU2, the target acceptance function FU3, the conversion function FU11, the optimization function FU12, and the adjustment function FU4. The device link profile creation program causes the host device 100 to implement the storage function FU1 and the device link profile 630 generation function FU5.

The CPU 111 of the host device 100 carries out various processes by reading out information stored in the storage device 114 into the RAM 113 and executing the read-out programs as appropriate. The CPU 111 carries out respective processes of the aforementioned functions FU1 to FU5 by executing the device link profile adjustment program PR0, the device link profile creation program, and the like loaded into the RAM 113. The device link profile adjustment program PR0 causes the host device 100, which is a computer, to function as the storage unit U1, the color space selection unit U2, the target acceptance unit U3, the conversion unit U11, the optimization unit U12, and the adjustment unit U4. The device link profile creation program causes the host device 100, which is a computer, to function as the storage unit U1 and the generation unit U5. Additionally, the host device 100 executing the device link profile adjustment program PR0 carries out the storage step ST1, the color space selection step ST2, the target acceptance step ST3, the conversion step ST11, the optimization step ST12, and the adjustment step ST4. The host device 100 executing the device link profile creation program carries out the storage step ST1 and the generation step ST5. A computer-readable medium storing the device link profile adjustment program PR0 that causes a computer to implement the aforementioned functions FU1 to FU4 is not limited to a storage device within the host device, and may be a recording medium external to the host device. Of course, a computer-readable medium storing the device link profile creation program that causes a computer to implement the aforementioned functions FU1 and FU5 is not limited to a storage device within the host device, and may be a recording medium external to the host device.

Note that the host device 100 includes a computer such as a personal computer (including a tablet-type terminal). For example, when a main unit of a desktop-type personal computer is employed as the host device 100, the display device 130, the colorimetric device 120, and the printer 200 are normally connected to that main unit. When a computer with an integrated display device, such as a laptop-type personal computer, is employed as the host device 100, the colorimetric device 120 and the printer 200 are normally connected to that computer. Even if the host device has an integrated display device, display data is still output to that internal display device. Additionally, the host device 100 may include all of the constituent elements 111 to 119 within a single housing, or may include a plurality of separate devices that can communicate with each other. Furthermore, this technique can be implemented even if at least one of the display device 130, the colorimetric device 120, and the printer 200 is provided in the host device 100.

The printer 200 illustrated in FIG. 1 (an example of an output device) is assumed to be an ink jet printer that forms an output image IM0 corresponding to print data by discharging (ejecting) C (cyan) ink, M (magenta) ink, Y (yellow) ink, and K (black) ink, serving as color materials, from a recording head 220. The recording head 220 is supplied with CMYK (cyan, magenta, yellow, and black) inks from ink cartridges Cc, Cm, Cy, and Ck, respectively, and discharges CMYK ink droplets 280 from nozzles Nc, Nm, Ny, and Nk, respectively. When the ink droplets 280 land upon a print substrate ME1, ink dots are formed on the print substrate ME1. A printed material having the output image IM0 on the print substrate ME1 is obtained as a result.

(3) Specific Example of Color Management System:

Next, an example of a color management system to which this technique can be applied will be described with reference to FIG. 2.

The color management system illustrated in FIG. 2 uses a Raster Image Processor (RIP) 400 implemented by the above-described host device 100, for example, to convert print document data D0 into output data expressing print colors $cmyk_p$ (cyan, magenta, yellow, and black), and cause the ink jet printer 200 to form a printed material. The print document data D0 expresses process colors $CMYK_{in}$ for reproducing colors serving as targets (target colors $C_T$) for CMYK inks (color materials) of a target printing press 300, which is an example of a target device for color matching.

Although the target printing press 300 assumes an offset printing press, the target printing press 300 may be a gravure printing press, a flexography printing press, and the like. The target colors $C_T$ are expressed, for example, by the coordinate values (Lab values) in CIE Lab color space. FIG. 2 illustrates a situation in which the target printing press 300 prints a color chart CH0 expressing the target colors $C_T$ onto a print substrate, and the colorimetric device acquires colorimetric values $Lab_T$ by measuring each patch in the color chart CH0. The process colors $CMYK_{in}$ correspond to usage amounts of the CMYK inks used by the target printing press 300, and express CMYK color space coordinates dependent on the target printing press 300.

The RIP 400 illustrated in FIG. 2 includes the input profile 610, the output profile 620, and the device link profile 630. The input profile 610 is a file denoting color characteristics of the ink used by the target printing press 300. The output profile 620 is a file denoting color characteristics of the ink used by the ink jet printer 200. The device link profile 630 is a file denoting the color characteristics of the ink used by the target printing press 300 and the color characteristics of the ink used by the printer 200 in a linked state. An ICC profile data format, for example, can be used for the profiles 610, 620, and 630. The process colors $CMYK_{in}$ of the print document data D0 are converted into the print colors $cmyk_p$ in accordance with the device link table 631 of the device link profile 630. This corresponds to the process colors $CMYK_{in}$ being converted into Lab color space colors $Lab_{S1}$ in accordance with the A2B table 611 (an example of the second conversion table) of the input profile 610, and being converted into the print colors $cmyk_p$ in accordance with the B2A table 621 (an example of the third conversion table) of the output profile 620.

When the printer 200 uses a total of four CMYK color inks, the print colors $cmyk_p$ are output by the printer 200 and reproduced on a printed material. FIG. 2 illustrates a situation in which the printer 200 prints a color chart CH1 expressing the print colors $cmyk_p$ onto a print substrate, and the colorimetric device 120 acquires the colorimetric values $Lab_p$ by measuring each patch in the color chart CH1. When the printer 200 also uses inks such as Lc (light cyan), Lm (light magenta), Dy (dark yellow), Lk (light black), and the like, and the RIP 400 or the printer 200 classifies the print colors $cmyk_p$ into dark colors and light colors, the printer 200 can reproduce the print colors $cmyk_p$ on the printed material. Of course, the print colors themselves are not limited to a total of four CMYK colors.

Note that in addition to the process colors $CMYK_{in}$, the RIP 400 also includes a device link profile derived from the input profile for converting process colors expressing usage amounts of the color materials of only three primary colors CMY, which is a subtractive color mixture ($CMY_{in}$), process colors expressing intensities of three primary colors R (red), G (green), and B (blue), which is an additive color mixture ($RGB_{in}$), and the like, and the Lab color space coordinate values. Accordingly, the RIP 400 can also convert process colors $CMY_{in}$, process colors $RGB_{in}$, and the like into the print colors $cmyk_p$.

Through the foregoing, the ink jet printer 200 can reproduce colors close to the colors of the target printing press 300. In practice, however, there are cases where the expected colors cannot be reproduced, due to profile error, color measurement error, fluctuations in the printer, and the like. In such a case, it is conceivable to increase the conversion accuracy of the target colors by modifying the device link profile 630. When modifying the output profile 620, it is conceivable to take the $Lab_{S1}$ values in a profile connection space (PCS) as target values, take the results of measuring colors printed by the printer 200 ($Lab_p$) as current values, calculate a color difference between the two, and modify the output profile 620 so as to reduce that color difference. Additionally, when modifying the input profile 610, it is conceivable to convert color chart data between the input profile 610 and the output profile 620 and print the color charts, calculate a color difference between the measurement results of each patch ($Lab_p$) and the target color values ($Lab_T$), and modify the input profile 610 so as to reduce that color difference.

However, although the device link profile 630 that has already been created contains input-side CMYK values and output-side cmyk values, the device link profile 630 does not contain PCS values. Accordingly, when carrying out spot color adjustment, an adjustment target based on the PCS coordinates cannot be fed back directly into the device link profile 630.

In this specific example, the color conversion table (at least one of the A2B table and the B2A table) of the original profile (at least one of the input profile 610 and the output profile 620) used to create the device link table 631 of the device link profile 630 is associated with the device link profile 630. Using the color conversion table of the original profile to adjust the device link table 631 makes it possible to adjust the device link table 631 with ease.

(4) Specific Examples of Profiles:

FIG. 3 schematically illustrates an example of relationships between the profiles 610, 620, and 630.

As illustrated in FIG. 3, the input profile 610 is data defining a correspondence relationship between CMYK values ($C_i$, $M_i$, $Y_i$, $K_i$) in a CMYK color space (an example of the first device-dependent color space CS1) matching the ink used by the target printing press 300, and Lab values ($L_i$, $a_i$, $b_i$) in a Lab color space (an example of the PCS (profile connection space) CS3). In this case, grid points GD1 in the A2B table 611 are normally arranged at substantially equal intervals in a C axis direction, an M axis direction, a Y axis direction, and a K axis direction in the CMYK color space. Here, the variable i is a variable identifying the grid points GD1 set in the CMYK color space (CS1). The CMYK values are examples of first coordinate values. The Lab values are examples of device-independent coordinate values. In the input profile 610, the CMYK color space (CS1) is an example of an input color space CS4, and the Lab color space (CS3) is an example of an output color space CS5.

Note that the first device-dependent color space may also be referred to as a first color space.

The output profile 620 is data defining a correspondence relationship between Lab values ($L_j$, $a_j$, $b_j$) in the Lab color space (CS3) and cmyk values ($c_j$, $m_j$, $y_j$, $k_j$) in the cmyk color space (an example of the second device-dependent color space CS2) matching the ink used by the ink jet printer 200. In this case, grid points GD2 in the B2A table 621 are normally arranged at substantially equal intervals in an L axis direction, an a axis direction, and a b axis direction in the Lab color space. Here, the variable j is a variable identifying the grid points GD2 set in the Lab color space (CS3). The term "cmyk color space" is used to distinguish the color space matching the ink used by the printer 200 from the color space matching the ink used by the target printing press 300. The cmyk values are examples of the second coordinate values. In the output profile 620, the Lab color space (CS3) is an example of the input color space CS4, and the cmyk color space (CS2) is an example of the output color space CS5. The color reproduction range of the output colors expressed by the cmyk values ($cmyk_p$) is dependent on the printer 200. Accordingly, even if the Lab values ($L_j$, $a_j$, $b_j$) of the B2A table 621 are values expressing out of the color reproduction range of the printer 200, the cmyk values ($c_j$, $m_j$, $y_j$, $k_j$) obtained through mapping to the color reproduction range of the printer 200 are associated with the Lab values ($L_j$, $a_j$, $b_j$).

Note that the second device-dependent color space may also be referred to as a second color space.

The device link profile 630 is data defining a correspondence relationship between the CMYK values ($C_i$, $M_i$, $Y_i$, $K_i$) in the CMYK color space (CS1) and the cmyk values ($c_i$, $m_i$, $y_i$, $k_i$) in the CMYK color space (CS2). The grid points GD1 of the device link table 631 in this case are grid points in the A2B table 611 of the input profile 610. Here, the variable i is a variable identifying the grid points GD1 set in the CMYK color space (CS1). The device link profile 630 is obtained by linking the input profile 610 and the output profile 620. In the device link profile 630, the CMYK color space (CS1) is an example of the input color space CS4, and the cmyk color space (CS2) is an example of the output color space CS5.

Note that the conversion tables included in the profiles 610, 620, and 630 are not limited to single conversion tables, and may be combinations of a plurality of conversion tables, such as a combination of a one-dimensional conversion table, a three-dimensional or four-dimensional conversion table, and a one-dimensional conversion table. Accordingly, the conversion tables illustrated in FIG. 3 may directly indicate three-dimensional or four-dimensional conversion tables included in the profiles 610, 620, and 630, or may indicate a state in which a plurality of conversion tables included in the profiles 610, 620, and 630 have been combined.

The "grid point" refers to a virtual point disposed in the input color space, and it is assumed that the output coordinate values corresponding to positions of the grid points in the input color space are held in the grid points. In addition to a plurality of grid points being disposed uniformly throughout the input color space, this technique also includes disposing a plurality of grid points non-uniformly throughout the input color space.

Figure 4:
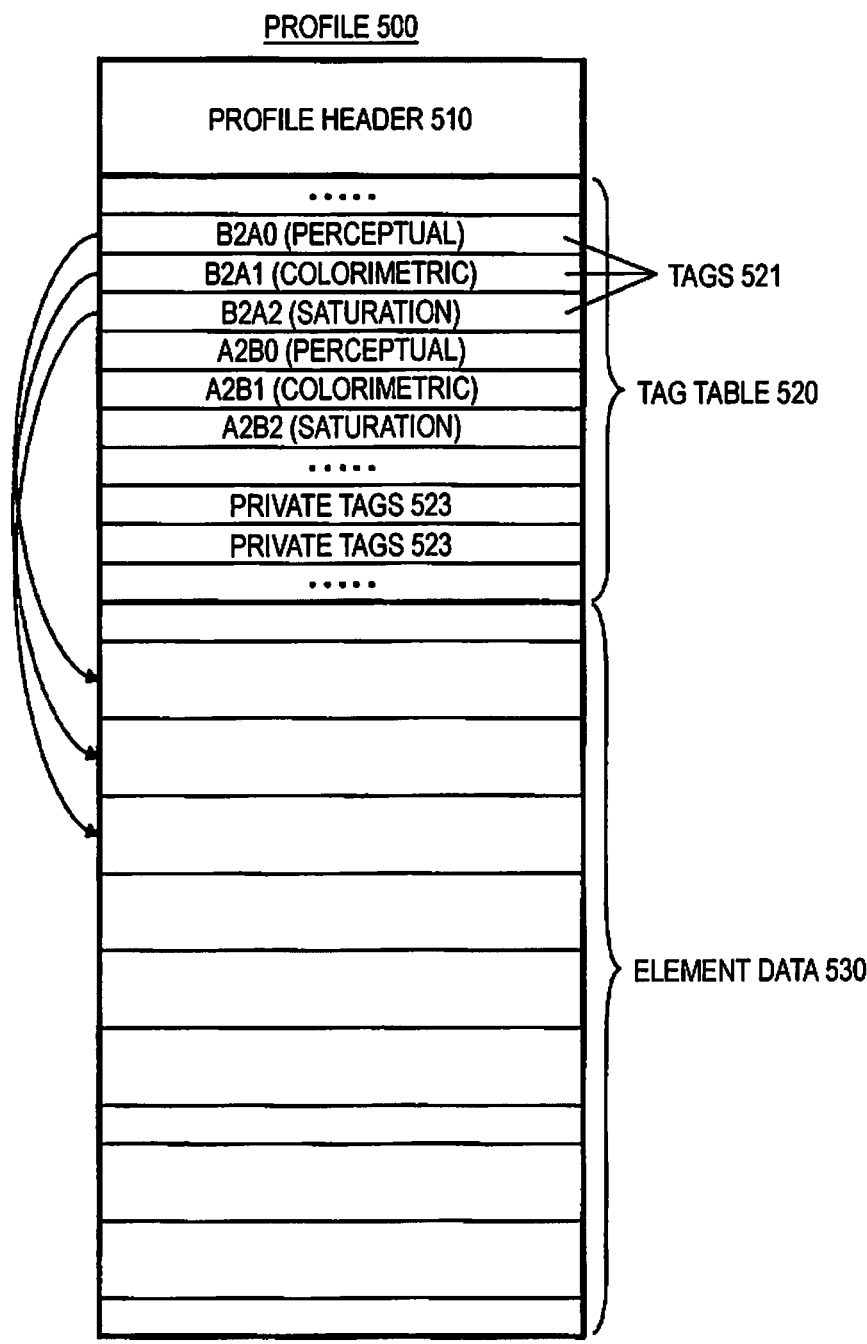
FIG. 4 is a diagram schematically illustrating an example of the structure of a profile.

FIG. 4 schematically illustrates an example of the structure of the profile 500. The profile 500 illustrated in FIG. 4 is an ICC profile, and includes a profile header 510 and a tag table 520. The profile 500 includes tags 521, which are information necessary for converting color information between PCS and a device-dependent color space. The tags 521 may include private tags 523 for customizing the profile 500.

A2Bx tags (where x is 0, 1, or 2 in FIG. 4) for devices (300, 200) include, as element data 530, color conversion tables for converting from the device-dependent color space (the CMYK color space, the cmyk color space) to the Lab color space. B2Ax tags for the devices (300, 200) include, as the element data 530, color conversion tables for converting from the Lab color space to the device-dependent color space (the CMYK color space, the cmyk color space).

The A2B0 tag and the B2A0 tag indicated in FIG. 4 are information for perceptual color conversion. Perceptual color conversion prioritizes gradation reproduction, and thus is mainly used to convert photographic images with wide color gamut. The A2B1 tag and the B2A1 tag indicated in FIG. 4 are information for carrying out Media-Relative Colorimetric color conversion or Absolute Colorimetric color conversion. Colorimetric color conversion is faithful to colorimetric values, and thus is mainly used in conversion for color calibration output of a digital proof, for which accurate color matching is required. The A2B2 tag and the B2A2 tag indicated in FIG. 4 are information for color conversion prioritizing saturation. Color conversion prioritizing saturation prioritizes vividness of a color rather than color accuracy, and is mainly used in conversion of graph displays and the like for business graphics.

Figure 5:
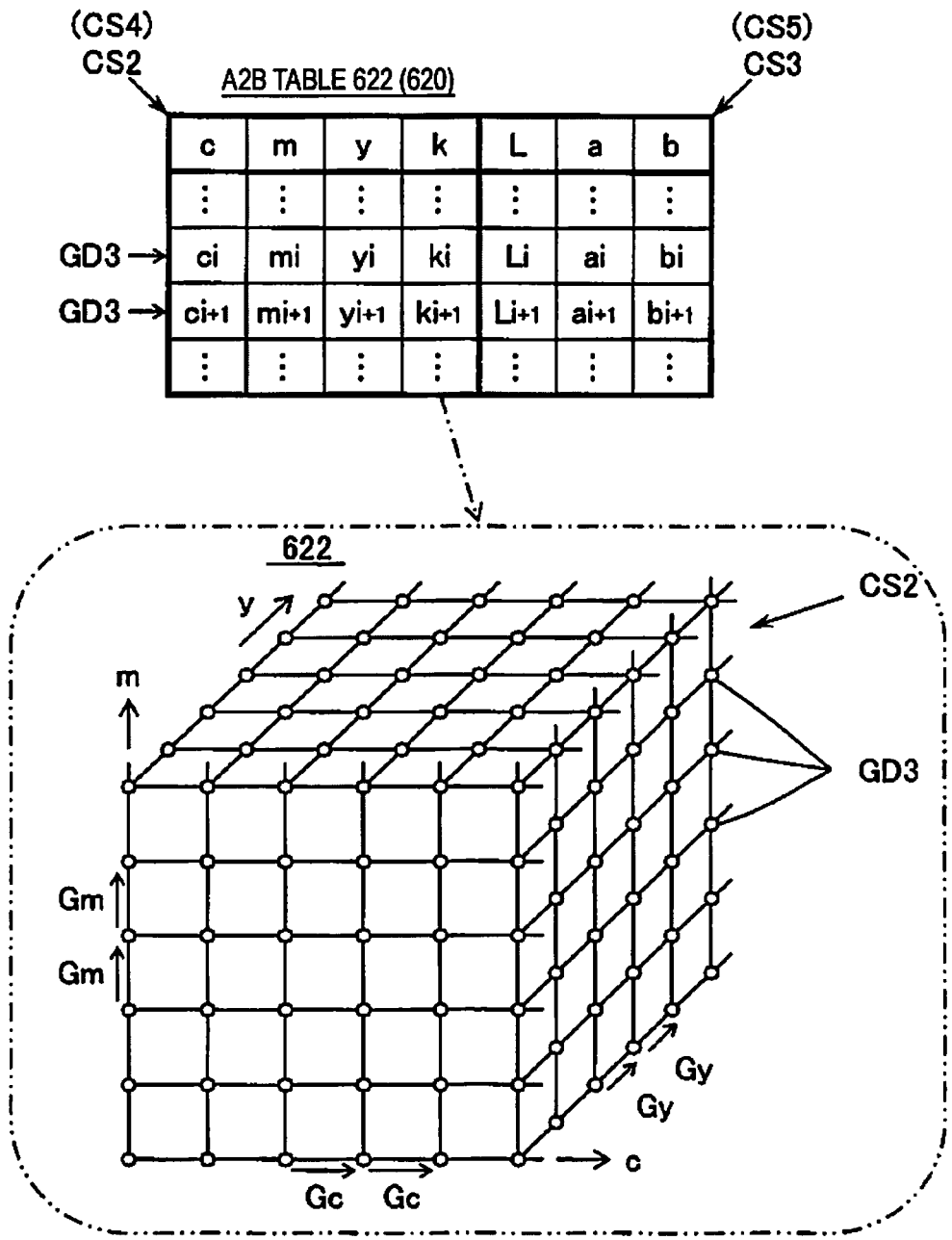
FIG. 5 is a diagram schematically illustrating an example of the structure of a first conversion table of an output profile.

FIG. 5 schematically illustrates an example of the structure of the A2B table 622 (an example of the first conversion table) in the output profile 620. The lower part of FIG. 5 schematically illustrates an example of the positions of grid points GD3 in the cmyk color space (CS2). Here, the cmyk color space is a four-dimensional color space, and thus FIG. 5 illustrates a three-dimensional virtual space formed by a c axis, an m axis, and a y axis. The grid points GD3 in the A2B table 622 are normally arranged at substantially equal intervals in a c axis direction, an m axis direction, a y axis direction, and a k axis direction in the cmyk color space. Here, the variable i is a variable identifying the grid points GD3 set in the cmyk color space (CS2). In the lower part of FIG. 5, Gc indicates the interval between the grid points GD3 in the c axis direction, Gm indicates the interval between the grid points GD3 in the m axis direction, and Gy indicates the interval between the grid points GD3 in the y axis direction. The Lab values ($L_i$, $a_i$, $b_i$) of the A2B table 622 are coordinate values expressing the output colors in the color reproduction range of the printer 200 (the cmyk values $c_i$, $m_i$, $y_i$, $k_i$). Of course, the conversion table illustrated in FIG. 5 may directly indicate the four-dimensional conversion table included in the output profile 620, or may indicate a state in which a plurality of conversion tables included in the output profile 620 have been combined.

As illustrated in FIGS. 3 and 5, the output profile 620 includes the B2A table 621, which is used in color conversion from Lab values to cmyk values, and the A2B table 622, which is used in color conversion from cmyk values to Lab values. The B2A table 621 is a three-dimensional color conversion table that has undergone gamut mapping, and the A2B table 622 is a four-dimensional color conversion table in which the cmyk values expressing the colors that can be output are associated with PCS values. Accordingly, when the PCS values $Lab_{S1}$ are converted into cmyk values $cmyk_p$ in accordance with the B2A table 621, and the cmyk values $cmyk_p$ are then converted into the PCS values $Lab_{S2}$ in accordance with the A2B table 622, there are situations where the PCS values $Lab_{S2}$ do not match the original PCS values $Lab_{S1}$.

First, an example of a method for creating the device link profile will be described with reference to FIGS. 6, 7, and the like. The device link table 631 of the device link profile 630 created through this method is subject to adjustment.

FIG. 6 illustrates an example of a device link profile creation process carried out by the host device 100 illustrated in FIG. 1. FIG. 7 schematically illustrates an example of the structure of the device link profile 630 created through the device link profile creation process illustrated in FIG. 6. Note that the host device 100 executes a plurality of processes in parallel in a multitasking manner. Here, steps S802 to S812 in FIG. 6 correspond to the generation step ST5, the generation function FU5, and the generation unit U5. Steps S814 to S816 in FIG. 6 correspond to the storage step ST1, the storage function FU1, and the storage unit U1. The word "step" will be omitted hereinafter.

Once the device link profile creation process illustrated in FIG. 6 is started, the host device 100 accepts a designation of the input profile 610 used to create the device link profile 630 (S802). The process of S802 can be a process of, for example, displaying, in the display device 130, a list of input profiles 610 stored in the storage device 114, and then accepting, through the input device 115, the designation of one of the input profiles from the list.

The host device 100 also accepts the designation of the output profile 620 used to create the device link profile 630 (S804). The process of S804 can be a process of, for example, displaying, in the display device 130, a list of output profiles 620 stored in the storage device 114, and then accepting, through the input device 115, the designation of one of the output profiles from the list.

Next, in S806, the host device 100 loads the A2B table 611 from the input profile 610 into the RAM 113. As illustrated in FIG. 3, the A2B table 611 of the input profile 610 is data expressing the correspondence relationships between the CMYK values $C_i$, $M_i$, $Y_i$, and $K_i$ and the PCS values $L_i$, $a_i$, and $b_i$ for each of the grid points GD1 arranged in the CMYK color space (CS1).

Next, in S808, the host device 100 loads the B2A table 621 from the output profile 620 into the RAM 113. As illustrated in FIG. 3, the B2A table 621 of the output profile 620 is data expressing the correspondence relationships between the PCS values $L_j$, $a_j$, and $b_j$ and the cmyk values $c_j$, $m_j$, $y_j$, and $k_j$ for each of the grid points GD2 arranged in the Lab color space, which serves as the PCS CS3.

Next, in S810, the host device 100 converts the PCS values $L_i$, $a_i$, and $b_i$, which are the output values of the grid points GD1 in the A2B table 611 of the input profile 610, in accordance with the B2A table 621 of the output profile 620. If there are PCS values $L_i$, $a_i$, and $b_i$ in the input values of the B2A table 621, the cmyk values $c_j$, $m_j$, $y_j$, and $k_j$, which are the corresponding output values, may be set as the output values of the device link table 631. If there are no PCS values $L_i$, $a_i$, and $b_i$ in the input values of the B2A table 621, the output values of the device link table 631 ($c_j$, $m_j$, $y_j$, and $k_j$) may be set by carrying out an interpolation process using the cmyk values of a plurality of grid points, among all the grid points GD2 of the B2A table 621, that have nearby input values.

The host device 100 generates the device link table 631 by associating the CMYK values $C_i$, $M_i$, $Y_i$, and $K_i$ with the cmyk values $c_j$, $m_j$, $y_j$, and $k_j$ for each of the grid points GD1, and stores the device link table 631 in the device link profile 630 (S812). As illustrated in FIG. 3, the obtained device link table 631 is data expressing a correspondence relationship between the CMYK values $C_i$, $M_i$, $Y_i$, and $K_i$ and the cmyk values $c_j$, $m_j$, $y_j$, and $k_j$, for each of the grid points GD1 arranged in the CMYK color space (CS1).

The device link profile obtained through the processes of S802 to S812 can be used in printing carried out by the printer 200. In this specific example, adjusting the device link profile 630 is made easier by storing the A2B table 622 of the output profile 620 in the private tags 523 of the device link profile 630, as illustrated in FIG. 7.

First, in S814, the host device 100 loads the A2B table 622 from the output profile 620 into the RAM 113. Next, the host device 100 stores the A2B table 622 in the private tags 523 of the device link profile 630 (S816), and then terminates the device link profile creation process.

The device link profile 630 illustrated in FIG. 7 is an ICC profile, and includes the profile header 510 and the tag table 520. The tags 521 may include private tags 523*a*, 523*b*, 523*c*, and the like for customizing the profile 500. The device link profile 630 includes the device link table 631 and the A2B table 622 of the output profile 620 as the element data 530. The device link table 631 illustrated in FIG. 7 is stored in a location corresponding to the A2B0 tag in the device link profile 630. Of course, the device link table 631 stored in the device link profile 630 may be any one of a device link table 631*a* for perceptual color conversion, a color conversion table for relative colorimetric color conversion, a color conversion table for saturation color conversion, and the like. Information indicating what rendering intent the device link table 631 has been created with is stored in the profile header 510. Additionally, FIG. 7 indicates that the A2B table 622 of the output profile 620 is stored in the private tag 523*a*.

Figure 9:
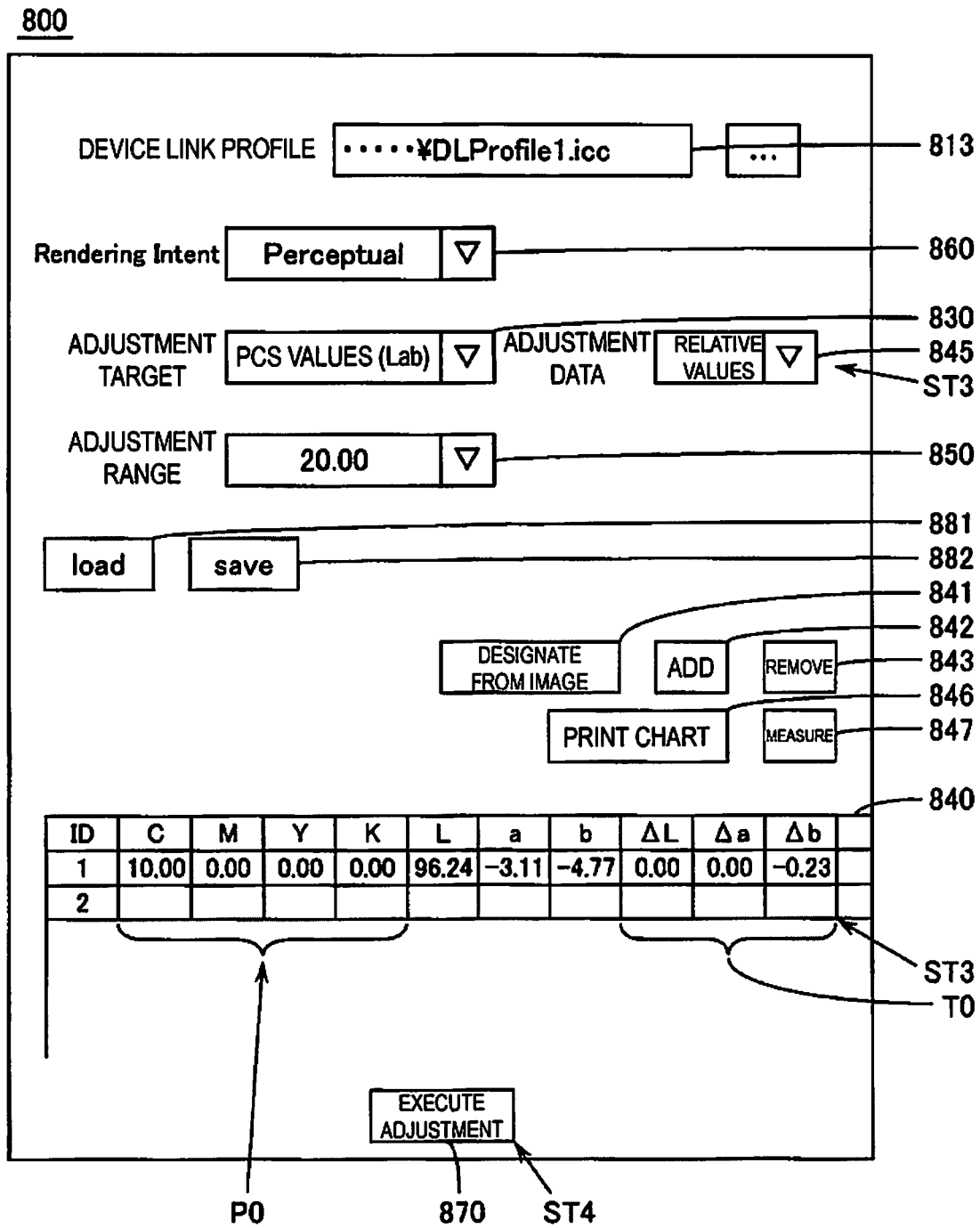
FIG. 9 is a diagram schematically illustrating an example of a user interface screen.

(5) Specific Example of Processing by Device Link Profile Adjustment System:

FIG. 8 illustrates an example of a target setting process carried out by the host device 100 illustrated in FIG. 1. The optimization process illustrated in FIG. 10 is carried out after this target setting process. FIG. 9 illustrates an example of a user interface (UI) screen 800 displayed in step S102 of FIG. 8. Here, step S112 in FIG. 8 corresponds to the color space selection step ST2, the color space selection function FU2, and the color space selection unit U2. Step S113 in FIG. 8 corresponds to the target acceptance step ST3, the target acceptance function FU3, and the target acceptance unit U3. Steps S122 to S126 in FIG. 8 correspond to the conversion step ST11 included in the adjustment step ST4, the conversion function FU11 included in the adjustment function FU4, and the conversion unit U11 included in the adjustment unit U4.

Upon the target setting process illustrated in FIG. 8 starting, the host device 100 displays the UI screen 800 illustrated in FIG. 9 in the display device 130 (S102). The UI screen 800 includes: a device link profile selection field 813; an adjustment target color space selection field 830; a target acceptance area 840, a "set from image" button 841; an add button 842; a remove button 843; an adjustment data selection field 845; a chart print button 846; a measure color button 847; an adjustment range designation field 850; an intent designation field 860; an execute adjustment button 870; a load history button 881; and a save history button 882.

The host device 100 accepts operations to the aforementioned fields and buttons through the input device 115 (S110), and moves the process to S120 upon accepting an operation to the execute adjustment button 870. The process of S110 includes the following processes S111 to S115.

(S111) A process of accepting the designation of the device link profile 630 to be adjusted.

(S112) A process of accepting at least one of the CMYK color space (CS1) and the cmyk color space (CS2), and, the PCS CS3 as the adjustment target color space CS6.

(S113) A process of accepting the input of the adjustment target T0 at the adjustment point P0, taking the coordinates of the adjustment target color space CS6 as a reference.

(S114) A process of accepting the designation of an adjustment range A0 in the CMYK color space (CS1) (see FIG. 13), the adjustment range A0 being subjected to adjustment based on the target T0 in the device link profile 630.

First, the process of S111 will be described with reference to FIG. 9.

Upon accepting an operation in the device link profile selection field 813 through the input device 115, the host device 100 can display, in the display device 130, a list of the device link profiles 630 stored in the storage device 114. The host device 100 accepts, through the input device 115, a single device link profile from the displayed list of device link profiles 630 as an adjustment target.

Next, the process of S112 will be described with reference to FIG. 9.

"Input data", "output data", and "PCS values" are included in the plurality of selection items in the adjustment target color space selection field 830 indicated in FIG. 9. "Input data" is an item used when selecting the CMYK color space (CS1) as the adjustment target color space CS6. "Output data" is an item used when selecting the cmyk color space (CS2) as the adjustment target color space CS6. "PCS values" is an item used when selecting the Lab color space (CS3) as the adjustment target color space CS6. Through the input device 115, the host device 100 accepts one of "input data", "output data", and "PCS values" as the adjustment target color space CS6.

Note that the adjustment target color space selection field 830 may lack one of the "input data" and "output data". If the "input data" is not present, the host device 100 accepts the cmyk color space (CS2) or the PCS CS3 as the adjustment target color space CS6. If the "output data" is not present, the host device 100 accepts the CMYK color space (CS1) or the PCS CS3 as the adjustment target color space CS6.

Furthermore, the process of S113 will be described with reference to FIGS. 9 and 11.

The host device 100 carries out a process for changing the input items in the target acceptance area 840 in accordance with the selection made in the aforementioned adjustment target color space selection field 830. The host device 100 carries out a process for changing the input items in the target acceptance area 840 in accordance with the selection made in the adjustment data selection field 845. One of "absolute value" and "relative value" can be selected in the adjustment data selection field 845. "Absolute value" is an option in which an adjustment target T0 is accepted as the coordinate values in a color space. "Relative value" is an option in which the adjustment target T0 is accepted as a difference from the current coordinate values in the color space.

A case where a designation of "PCS values" has been accepted through the adjustment data selection field 845, i.e., a case where the adjustment target color space CS6 is the PCS CS3, will be described first. In this case, the process of S113 corresponds to the target acceptance step ST3, the target acceptance function FU3, and the target acceptance unit U3, which accept the adjustment target T0 at the adjustment point P0, taking the coordinates of the PCS CS3 as a reference.

Upon accepting "relative value" through the adjustment data selection field 845, the host device 100 displays an input field for coordinate values ($\Delta L$, $\Delta a$, $\Delta b$) of the adjustment target T0, as the relative values $\Delta Lab_{T-p}$ from the current PCS CS3 coordinate values, in the target acceptance area 840, as indicated in FIG. 9. Meanwhile, upon "absolute value" being accepted through the adjustment data selection field 845, the host device 100 displays an input field for coordinate values (T_L, T_a, T_b) of the adjustment target T0 in the target acceptance area 840 along with a display field for the current PCS CS3 coordinate values (C_L, C_a, C_b).

The following processing is carried out if a designation of "input data" has been accepted through the adjustment data selection field 845, i.e., if the adjustment target color space CS6 is the CMYK color space (CS1).

Upon "relative value" being accepted through the adjustment data selection field 845, the host device 100 displays an input field for coordinate values ($\Delta C$, $\Delta M$, $\Delta Y$, $\Delta K$) of the adjustment target T0, as the relative values $\Delta CMYK_{T-p}$ from the current CMYK color space (CS1) coordinate values, in the target acceptance area 840. Meanwhile, upon "absolute value" being accepted through the adjustment data selection field 845, the host device 100 displays an input field for coordinate values (T_C, T_M, T_Y, T_K) of the adjustment target T0 in the target acceptance area 840 along with a display field for the current CMYK color space (CS1) coordinate values (C_C, C_M, C_Y, C_K).

The following processing is carried out if a designation of "output data" has been accepted through the adjustment data selection field 845, i.e., if the adjustment target color space CS6 is the cmyk color space (CS2).

Upon "relative value" being accepted through the adjustment data selection field 845, the host device 100 displays an input field for coordinate values ($\Delta c$, $\Delta m$, $\Delta y$, $\Delta k$) of the adjustment target T0, as the relative values $\Delta cmyk_{T-p}$ from the current cmyk color space (CS2) coordinate values, in the target acceptance area 840. Meanwhile, upon "absolute value" being accepted through the adjustment data selection field 845, the host device 100 displays an input field for coordinate values (T_c, T_m, T_y, T_k) of the adjustment target T0 in the target acceptance area 840 along with a display field for the current cmyk color space (CS2) coordinate values (C_c, C_m, C_y, C_k).

Figure 13:
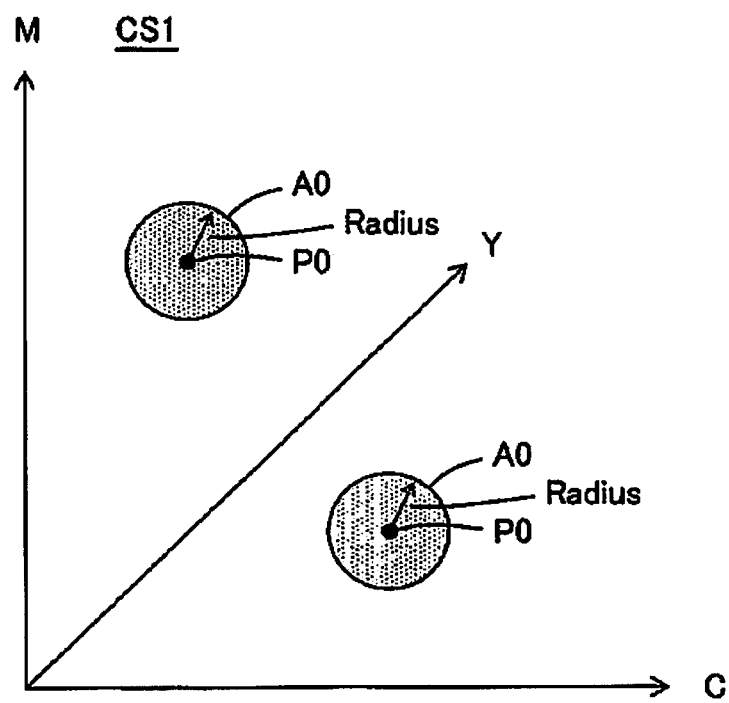
FIG. 13 is a diagram schematically illustrating an example of setting an adjustment point.

As illustrated in FIG. 13, the adjustment point P0 for setting the adjustment target T0 is set in the CMYK color space (CS1). Here, the CMYK color space is a four-dimensional color space, and thus FIG. 13 illustrates a three-dimensional virtual space formed by a C axis, an M axis, and a Y axis. For example, upon accepting an operation of the "set from image" button 841 in the UI screen 800 illustrated in FIG. 9, the host device 100 displays a screen schematically expressing the CMYK color space (CS1) in the display device 130, obtains CMYK values through operations through the input device 115, and updates the information in the target acceptance area 840. Upon a new adjustment point P0 being designated, the host device 100 applies a corresponding ID (identification information), associates the obtained CMYK values as well as Lab values and the like found from the CMYK values with the ID, and displays the CMYK values and the Lab values in the target acceptance area 840. Upon the add button 842 being operated, the host device 100 adds the ID, and expands an input field corresponding to the added ID in the target acceptance area 840. Upon the remove button 843 being operated, the host device 100 accepts a designation of an ID to be deleted, and deletes the input field corresponding to the designated ID.

Additionally, upon accepting an operation of the chart print button 846, the host device 100 generates print data of a color chart CH1, which has color patches expressing the colors at the respective adjustment points P0, and sends the print data to the printer 200. Having received this print data, the printer 200 prints the color chart CH1, which has color patches expressing the colors at the respective adjustment points P0, onto the print substrate ME1.

Furthermore, upon accepting an operation of the measure color button 847, the host device 100 instructs the colorimetric device 120 to measure the color of each patch in the color chart CH1. Having received this instruction, the colorimetric device 120 measures the color of each patch in the color chart CH1, and sends the colorimetric values $Lab_p$ of the patches to the host device 100. Having received the colorimetric values $Lab_p$, the host device 100 may display the colorimetric values $Lab_p$ in the display device 130, or may cause the printer 200 to print the values. The user can view the output colorimetric values $Lab_p$ and input the adjustment target T0 in the target acceptance area 840. Additionally, the host device 100 may automatically input the colorimetric values $Lab_p$ of the patches into the target T0 input field. When the adjustment target T0 is the relative values (ΔL, Δa, Δb), the host device 100 may calculate differences of the L, a, and b components in the target colorimetric values $Lab_T$ from the current colorimetric values $Lab_p$ and automatically input the differences into the target T0 input field.

Furthermore, upon accepting an operation of the load history button 881, the host device 100 reads out the adjustment history stored in the storage device 114 and adds the history to the target acceptance area 840. Upon accepting an operation of the save history button 882, the host device 100 stores the information in the target acceptance area 840 as the adjustment history in the storage device 114.

Furthermore, the process of S114 will be described with reference to FIGS. 9 and 13.

The host device 100 accepts, in the adjustment range designation field 850, the input of a radius taking the adjustment point P0 as a base point. This radius is expressed as a relative value from 0 to 100% of a Euclidian distance in the first color space CS1. Accordingly, the adjustment range A0 of the device link profile 630 is designated in the first color space CS1. In this application, "from Min to Max" means greater than or equal to a minimum value Min and less than or equal to a maximum value Max.

FIG. 13 schematically illustrates an example of the adjustment range A0 when the radius has been designated. As illustrated in FIG. 13, the adjustment range A0 is set for each adjustment point P0. The host device 100 can accept the input of the adjustment range A0 for each of the adjustment points P0 in the target acceptance area 840.

Upon accepting an operation of the execute adjustment button 870 indicated in FIG. 9, the host device 100 branches the processing depending on whether the adjustment target color space CS6 is the PCS CS3 (S120). When the adjustment target color space CS6 is the PCS CS3, the host device 100 carries out the processes of S122 and the subsequent steps. When the adjustment target color space CS6 is the CMYK color space (CS1) or the cmyk color space (CS2), the host device 100 carries out the profile adjustment process illustrated in FIG. 12 without carrying out the processes of S122 and the subsequent steps, and the optimization process illustrated in FIG. 10.

In S122 to S126, the host device 100 calculates the adjustment target PCS values $Lab_{S2}$, which are color values corresponding to the output colors obtained when the colors of the adjustment point P0 are output by the printer 200. FIG. 2 illustrates the process of calculating the adjustment target PCS values $Lab_{S2}$ from the CMYK values $CMYK_{in}$ of the adjustment point P0.

First, in S122, the host device 100 reads out the device link table 631 from the device link profile 630 (see FIG. 7), and furthermore reads out the A2B table 622 of the output profile 620 from the private tags 523 of the device link profile 630. The A2B table 622 is the color conversion table in the original profile used to create the device link table 631, and thus the relationship between the device link table 631 and the A2B table 622 in the original profile is maintained.

Next, the host device 100 converts the CMYK values $CMYK_{in}$ at the adjustment point P0 into adjustment target color values $cmyk_p$ in accordance with the device link table 631 of the device link profile 630 (S124). The adjustment target color values $cmyk_p$ express output colors of the printer 200 before the adjustment of the adjustment point P0.

Here, color conversion according to a profile (for example, an ICC profile) will be expressed as $f_{icc}$ (first argument, second argument, third argument). The first argument expresses the profile to be used. In the first argument, DLProfile represents the device link profile, and OrOutputProfile represents an output profile used to create the device link profile. The second argument expresses the color conversion tables used in the profile expressed by the first argument. In the second argument, A2B represents conversion from device colors to device-independent colors, B2A represents conversion from device-independent colors to device colors, and A2B0 represents conversion through a device link table. The third argument expresses the input values (CMYK, RGB, Lab, and the like) of the adjustment point P0.

The conversion from the CMYK values $CMYK_{in}$ to the adjustment target color values $cmyk_p$ is expressed by the following equation.

$$cmyk_p = f_{icc}(DLProfile, A2B0, CMYK_{in})$$

Next, in S126, the host device 100 converts the above-described adjustment target color values $cmyk_p$ into the adjustment target PCS values $\text{Lab}_{S2}$, in accordance with the A2B table 622 of the output profile 620.

$$\text{Lab}_{S2} = f_{icc}(\text{OrOutputProfile}, A2B, \text{cmyk}_p) = f_{icc}(\text{OrOutputProfile}, A2B, f_{icc}(\text{DLProfile}, A2B0, \text{CMYK}_{in}))$$

The above-described adjustment target PCS values $\text{Lab}_{S2}$ are device-independent coordinate values expressing the output colors of the printer 200.

After the process of S126, the host device 100 carries out the optimization process illustrated in FIG. 10. This optimization process corresponds to the optimization step ST12 included in the adjustment step ST4, the optimization function FU12 included in the adjustment function FU4, and the optimization unit U12 included in the adjustment unit U4. In this specific example, the Boyden-Fletcher-Goldfarb-Shanno (BFGS) method, which is a quasi-Newton method, is used in the solution searching process of S210. Of course, a quasi-Newton method aside from the BFGS method, such as the DFP method, can be used for the solution searching process of S210. Aside from a quasi-Newton method, a Newton method, a conjugate gradient method, and the like can be used for the solution searching process of S210.

Upon the optimization process illustrated in FIG. 10 being started, the host device 100 calculates the target PCS values $\text{Lab}_{ST}$ by adding the relative values $\Delta\text{Lab}_{T-p}$ of the adjustment target T0, which take the PCS CS3 coordinates as a reference, to the adjustment target PCS values $\text{Lab}_{S2}$ (S202).

$$\text{Lab}_{ST} = \text{Lab}_{S2} + \Delta\text{Lab}_{T-p}$$

Next, in S204, the host device 100 sets initial values $\Delta\text{cmyk}_i$ of the adjustment color values $\Delta\text{cmyk}$ added to the adjustment target color values $\text{cmyk}_p$ for matching the adjustment target T0. As illustrated in FIG. 11, a plurality of the initial values $\Delta\text{cmyk}_i$ are prepared, and are set one at a time from the initial values $\Delta\text{cmyk}_i$. Here, the variable i is a variable for identifying the initial values. In the A2B table 622 used in the optimization process of S210, a plurality of four-dimensional inputs (cmyk values) can exist for a three-dimensional output (Lab values). Accordingly, many extreme values (minimum values or maximum values) can exist for a target function $y = f(\Delta\text{cmyk})$ that takes the four-dimensional adjustment color values $\Delta\text{cmyk}$ as a variable. As such, the solution searching process of S210 is carried out from a plurality of mutually-different initial values $\Delta\text{cmyk}_i$, and based on optimal solution candidates $\Delta\text{cmyk}_{pb}$, an optimal solution $\Delta\text{cmyk}_b$ is obtained.

Figure 11:
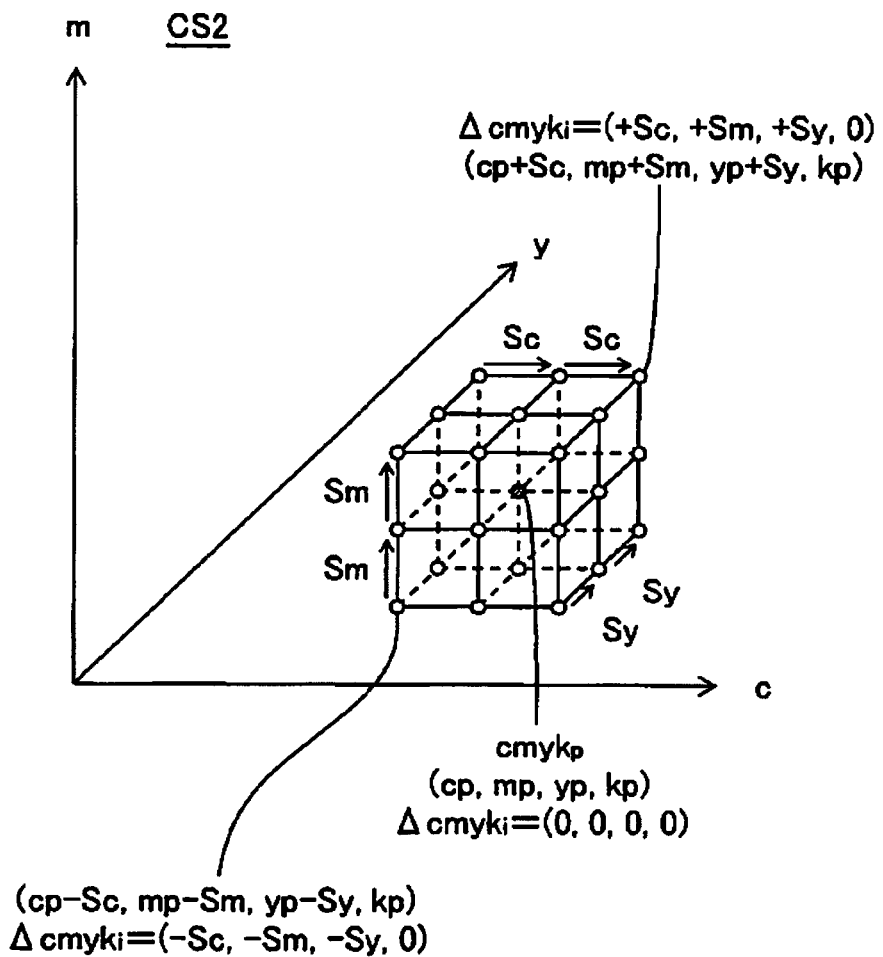
FIG. 11 is a diagram schematically illustrating an example of changing the initial values of adjustment color values.

FIG. 11 schematically illustrates an example of changing the initial values $\Delta\text{cmyk}_i$ of the adjustment color values $\Delta\text{cmyk}$. Here, the cmyk color space is a four-dimensional color space, and thus FIG. 11 illustrates a three-dimensional virtual space formed by a c axis, an m axis, and a y axis. In FIG. 11, the hatched circle indicates the position of the adjustment target color values $\text{cmyk}_p$. Here, the respective components of the initial values $\Delta\text{cmyk}_i$ are expressed as ($\Delta ci$, $\Delta mi$, $\Delta yi$, $\Delta ki$). One of the initial values $\Delta\text{cmyk}_i$ is ($\Delta ci$, $\Delta mi$, $\Delta yi$, $\Delta ki$) = (0, 0, 0, 0). This will be expressed as $\Delta\text{cmyk}_i = 0$. In this specific example, with $\Delta\text{cmyk}_i = 0$ as a center, the c values are shifted by an interval value Sc (Sc>0), the m values by an interval value Sm (Sm>0), and the y values by an interval value Sy (Sy>0), to prepare 3×3×3, or 27, of the initial values $\Delta\text{cmyk}_i$. To accelerate the optimization process, the initial value $\Delta k$ of k is fixed at 0. Accordingly, the initial values $\Delta\text{cmyk}_i$ are as follows.

$$(\Delta ci, \Delta mi, \Delta yi, \Delta ki) = (+Sc, +Sm, +Sy, 0)$$

$$(\Delta ci, \Delta mi, \Delta yi, \Delta ki) = (+Sc, +Sm, 0, 0)$$

$$(\Delta ci, \Delta mi, \Delta yi, \Delta ki) = (+Sc, +Sm, -Sy, 0)$$

$$(\Delta ci, \Delta mi, \Delta yi, \Delta ki) = (+Sc, 0, +Sy, 0)$$

$$(\Delta ci, \Delta mi, \Delta yi, \Delta ki) = (+Sc, 0, 0, 0)$$

$$\ldots$$

$$(\Delta ci, \Delta mi, \Delta yi, \Delta ki) = (0, 0, 0, 0)$$

$$\ldots$$

$$(\Delta ci, \Delta mi, \Delta yi, \Delta ki) = (-Sc, -Sm, -Sy, 0)$$

Of course, the initial value $\Delta k$ of k can be shifted by an interval value Sk (Sk>0). The number of initial values is not limited to 27, and may be 8, 81, or the like.

Note that the range that the c values, m values, y values, and k values, which are the second coordinate values, can take on in the cmyk color space (CS2) is not particularly limited, but can be set to be from 0 to 100 ($0 \leq c \leq 100$, $0 \leq m \leq 100$, $0 \leq y \leq 100$, and $0 \leq k \leq 100$). In the cmyk color space (CS2), the coordinates of the grid points GD3 in the A2B table 622 (see FIG. 5) are assumed to have the same scale as the coordinates of initial provisional color values $\text{cmyk}_{pp} = \text{cmyk}_p + \Delta\text{cmyk}_i$. The interval values Sc, Sm, and Sy of the initial values $\Delta\text{cmyk}_i$ can be set to be approximately from 0.5 to 2 times the intervals Gc, Gm, and Gy of the grid points GD3, for example. As expressions, this is expressed as follows.

$$0.5 \times Gc \leq Sc \leq 2 \times Gc$$

$$0.5 \times Gm \leq Sm \leq 2 \times Gm$$

$$0.5 \times Gy \leq Sy \leq 2 \times Gy$$

When a plurality of initial values $\Delta k$ are set for k as well, the interval value for the initial values $\Delta k$ (represented by Sk) can also be set to be approximately from 0.5 to 2 times the interval of the grid points GD3 in the k axis direction (represented by Gk), for example.

$$0.5 \times Gk \leq Sk \leq 2 \times Gk$$

When the interval values Sc, Sm, Sy, and Sk are set to be approximately from 0.5 to 2 times the intervals Gc, Gm, Gy, and Gk of the grid points GD3, the optimal solution $\Delta\text{cmyk}_b$ can be determined efficiently.

After the initial values $\Delta\text{cmyk}_i$ have been set, the host device 100 carries out the solution searching process (S210). The processes of S212 to S224 are repeated in this solution searching process.

First, in S212, the host device 100 calculates the provisional color values $\text{cmyk}_{pp}$ in which the adjustment color values $\Delta\text{cmyk}$ are added to the adjustment target color values $\text{cmyk}_p$. First, the adjustment color values $\Delta\text{cmyk}$ when carrying out the process of S212 are the initial values $\Delta\text{cmyk}_i$.

Next, in S214, the host device 100 converts the provisional color values $\text{cmyk}_{pp}$ to provisional PCS values $\text{Lab}_{S3}$ in accordance with the A2B table 622. As equations, this is expressed as follows.

$$\text{Lab}_{S3} = f_{icc}(\text{OrOutputProfile}, A2B, \text{cmyk}_{pp})$$

Next, in S216, the host device 100 calculates the square of a color difference between the provisional PCS values $\text{Lab}_{S3}$ and the target PCS values $\text{Lab}_{ST}$. Here, the color difference includes the color difference $\Delta E_{00}$ expressed by the CIEDE 2000 color difference type, a color difference $\Delta E^*_{94}$ expressed by the CIE 1994 color difference type, a color difference $\Delta E^*_{ab}$ according to the CIE L*a*b* color system proposed in 1976 (also known as $\Delta E^*_{76}$), a color difference $\Delta E^*_{uv}$ according to the CIE L*u*v* color system, and the like. In this specific example, $\Delta E_{00}$ is used for the color difference.

In the process of S216, using the color difference square $\Delta E_{00}^2$ eliminates the calculation of the square root included in the color difference $\Delta E_{00}$, which accelerates the solution searching process. The color difference square $\Delta E_{00}^2$ is included in the target function $y=f(\Delta cmyk)$. Accordingly, the target function $y=f(\Delta cmyk)$ includes an element for bringing the provisional PCS values $Lab_{S3}$ closer to the target PCS values $Lab_{ST}=Lab_{S2}+\Delta Lab_{T-p}$.

Although taking more time for the solution searching process, the color difference $\Delta E_{00}$ itself may be included in the target function $y=f(\Delta cmyk)$ instead of the color difference square $\Delta E_{00}^2$. Additionally, a color difference $\Delta E^*_{ab}$, a sum of the absolute value of an L value difference, the absolute value of an a value difference, the absolute value of a b value difference, and the like may be used instead of the color difference $\Delta E_{00}$.

Next, in S218, when the adjustment color values $\Delta cmyk$ are expressed as the vectors in the cmyk color space (CS2), the host device 100 calculates the square of magnitudes V of the vectors, separate from the color difference $\Delta E_{00}$, to calculate the target function $y=f(\Delta cmyk)$. Assuming the components of the adjustment color values $\Delta cmyk$ are expressed by ($\Delta c$, $\Delta m$, $\Delta y$, $\Delta k$), the magnitudes V of the vectors when the adjustment color values $\Delta cmyk$ are expressed as the vectors in the cmyk color space (CS2) are as expressed in the following equation.

$$V=\{\Delta c^2+\Delta m^2+\Delta y^2+\Delta k^2\}^{1/2}$$

By including the magnitudes V of the vectors of the adjustment color values $\Delta cmyk$ in the target function $y=f(\Delta cmyk)$, a situation where the absolute value of one of $\Delta c$, $\Delta m$, $\Delta y$, and $\Delta k$ in the adjustment color values $\Delta cmyk$ becomes prominently greater is suppressed.

The color difference square $\Delta E_{00}^2$ is included in the target function $y=f(\Delta cmyk)$, and thus the magnitudes V of the vectors of the adjustment color values $\Delta cmyk$ can also be included in the target function $y=f(\Delta cmyk)$.

$$V^2=\Delta c^2+\Delta m^2+\Delta y^2+\Delta k^2$$

This eliminates the calculation of the square root included in the magnitudes V of the vectors, which accelerates the solution searching process.

Although taking more time for the solution searching process, the magnitudes V of the vectors of the adjustment color values $\Delta cmyk$ themselves may be included in the target function $y=f(\Delta cmyk)$ instead of the squares $V^2$ of the magnitudes of the vectors of the adjustment color values $\Delta cmyk$. Additionally, a sum of the absolute values of $\Delta c$, $\Delta m$, $\Delta y$, and $\Delta k$ and the like may be used instead of the magnitudes V of the vectors of the adjustment color values $\Delta cmyk$.

Next, in S220, the host device 100 calculates a cost C based on restriction conditions of the range from 0 to 100 which the CMYK values (an example of the second coordinate values) can take on. This is because the provisional color values $cmyk_{pp}=cmyk_p+\Delta cmyk$ preferably fall within the range from 0 to 100 that the cmyk values can take on. Here, the components of the provisional color values $cmyk_{pp}$ will be expressed as ($c_{pp}$, $m_{pp}$, $y_{pp}$, and $k_{pp}$). The cost C can be calculated according to the following equations, for example.

When $c_{pp}<0$, then $C=-c_{pp}\times Cco$

When $c_{pp}>100$, then $C=(C_{pp}-100)\times Cco$

When $m_{pp}<0$, then $C=-m_{pp}\times Cco$

When $m_{pp}>100$, then $C=(m_{pp}-100)\times Cco$

When $y_{pp}<0$, then $C=-y_{pp}\times Cco$

When $y_{pp}>100$, then $C=(y_{pp}-100)\times Cco$

When $k_{pp}<0$, then $C=-k_{pp}\times Cco$

When $k_{pp}>100$, then $C=(k_{pp}-100)\times Cco$

Aside from the above, $C=0$.

Note that the coefficient Cco is a positive number, and is desirably approximately $10^3 \le Cco \le 10^9$, which is a number sufficiently greater than the range of from 0 to 100 that the CMYK values can take on.

When the above-described cost C is included in the target function $y=f(\Delta cmyk)$, the optimization process is carried out having applied the range from 0 to 100 that the CMYK values can take on to the restriction conditions for the range of the provisional color values $cmyk_{pp}$.

Of course, the cost C can be calculated in the same manner even if the range that the second coordinate values can take on is out of the range from 0 to 100. For example, the second coordinate values are assumed as RGB values and a range that the second coordinate values can take on is assumed as from 0 to 255, and the components of provisional color values $RGB_{pp}$ are assumed as ($R_{pp}$, $G_{pp}$, and $B_{pp}$). The cost C of a target function $y=f(\Delta RGB)$ can be calculated according to the following equations, for example.

When $R_{pp}<0$, then $C=(-R_{pp}\times Cco$

When $R_{pp}>255$, then $C=(R_{pp}-255)\times Cco$

When $G_{pp}<0$, then $C=-G_{pp}\times Cco$

When $G_{pp}>255$, then $C=(G_{pp}-255)\times Cco$

When $B_{pp}<0$, then $C=-B_{pp}\times Cco$

When $B_{pp}>255$, then $C=(B_{pp}-100)\times Cco$

Aside from the above, $C=0$.

Here too, the coefficient Cco is a positive number, and is approximately $10^3 \le Cco \le 10^9$, which is a number sufficiently greater than the range of from 0 to 255 that the RGB values can take on.

Additionally, the cost C may include an element aside from the range that the second coordinate values can take on. For example, when an error arises upon the processes of S212 to S220 being carried out for given adjustment color values $\Delta cmyk$, a value of approximately from $10^3$ to $10^9$ may be added to the cost C.

Next, in S222, the host device 100 calculates the target function $y=f(\Delta cmyk)$ including the color difference square $\Delta E_{00}^2$, the square $V^2$ of the magnitudes of the vectors of the adjustment color values $\Delta cmyk$, and the cost C. The target function $y=f(\Delta cmyk)$ is expressed by the following equation, for example.

$$y=\Delta E_{00}^2+w\times V^2+C$$

Note that the coefficient w is a positive number, and is approximately $1 \le w \le 10$, from a standpoint of suppressing a situation where any one of the absolute values of $\Delta c$, $\Delta m$, $\Delta y$, and $\Delta k$ of the adjustment color values $\Delta cmyk$ becomes prominently greater.

The above-described processes of S212 to S222 are repeated until a solution causing the target function y=f(Δcmyk) to be a minimum value (an optimal solution candidate $\Delta cmyk_{pb}$) is found. When the process of S224 is carried out first, it cannot be determined whether the target function y=f(Δcmyk) is the minimum value, and thus the host device 100 returns the process to S212 after changing the adjustment color values Δcmyk by a minute amount. The host device 100 then repeats the processes of S212 to S224 while changing the adjustment color values Δcmyk by minute amounts. Upon finding a solution causing the target function y=f(Δcmyk) to be the minimum value, the host device 100 takes the solution as the optimal solution candidate $\Delta cmyk_{pb}$ and ends the solution searching process of S210.

The host device 100 repeats the processes of S204 to S210 until all of the initial values $\Delta cmyk_i$ of the adjustment color values Δcmyk are set (S230). Through this, an optimal solution candidate $\Delta cmyk_{pb}$ is found for the respective initial values $\Delta cmyk_i$.

Next, in S232, the host device 100 obtains the optimal solution $\Delta cmyk_b$ based on the plurality of optimal solution candidates $\Delta cmyk_{pb}$. In S210, target function $y=\Delta E_{00}^2+w \times V^2+C$ is calculated for the respective initial values $\Delta cmyk_i$ in the solution searching process. For example, in S232, the host device 100 may determine an optimal solution candidate $\Delta cmyk_{pb}$ when the value of the target function y for the respective initial values $\Delta cmyk_i$ is lowest, as the optimal solution $\Delta cmyk_b$.

The obtained solution $\Delta cmyk_b$ is an optimal solution that brings the provisional PCS values $Lab_{S3}$ as close as possible to the target PCS values $Lab_{ST}=Lab_{S2}+\Delta Lab_{T-p}$. When obtaining the optimal solution $\Delta cmyk_b$, a situation where the absolute value of any of Δc, Δm, Δy, and Δk of the adjustment color values Δcmyk become prominently greater is suppressed, and the provisional color values $cmyk_{pp}$=adjustment target color values $cmyk_p$+adjustment color values Δcmyk are restricted to the range that the CMYK value can take on. The color reproduction accuracy of the device link profile can be improved by adjusting the device link profile 630 using such an optimal solution $\Delta cmyk_b$.

After the process of S232, the host device 100 carries out the profile adjustment process illustrated in FIG. 12. The profile adjustment process illustrated in FIG. 12 is carried out even when the adjustment target color space CS6 is the CMYK color space (CS1) or the cmyk color space (CS2) in S120 of FIG. 8. This profile adjustment process corresponds to the table adjustment step ST13 included in the adjustment step ST4, the table adjustment function FU13 included in the adjustment function FU4, and the table adjustment unit U13 included in the adjustment unit U4.

First, the host device 100 acquires the adjustment target color values $cmyk_p$, which are the current output values, for the respective adjustment point P0 input in the target acceptance area 840 (S304). This is in order to carry out adjustment using, as a reference, the output colors ($cmyk_p$) corresponding to the colors of the output image IM0 formed on the print substrate ME1. Here, in the device link table 631, the input values at each adjustment point P0 are the CMYK values $CMYK_{in}$ (where the respective components are Cp, Mp, Yp, and Kp). The adjustment target color values $cmyk_p$ (where the respective components are cp, mp, yp, and kp), which are the current output values, can be calculated through the following equation.

$$cmyk_p = f_{ice}(DLProfile, A2B0, CMYK_{in})$$

Note that if the adjustment target color values cmykp have already been calculated in S124 of FIG. 8, those adjustment target color values $cmyk_p$ may be acquired.

After the adjustment target color values cmykp have been obtained, the host device 100 finds target output values TargetOut for the adjustment points P0 input in the target acceptance area 840 (S306). Here, when the adjustment target color space CS6 is the PCS CS3, the adjustment target color values $cmyk_p$ and the optimal solution $\Delta cmyk_b$ obtained through the optimization process illustrated in FIG. 10 are used.

$$TargetOut = cmyk_p + \Delta cmyk_b$$

When the adjustment target color space CS6 is the CMYK color space (CS1), the target output values TargetOut are found through the following equation if the absolute values T_C, T_M, T_Y, and T_K (assuming $CMYK_T$) of the adjustment target T0 are present.

$$TargetOut = f_{ice}(DLProfile, A2B0, CMYK_T)$$

If the relative values $\Delta CMYK_{T-p}$ of the adjustment target T0 are present, the target output values TargetOut are found through the following equation along with the input values $CMYK_{in}$.

$$TargetOut = f_{ice}(DLProfile, A2B0, CMYK_{in} + \Delta CMYK_{T-p})$$

When the adjustment target color space CS6 is the cmyk color space (CS2), if the absolute values T_c, T_m, T_y, and T_k (assuming $cmyk_T$) of the adjustment target T0 are present, those values are taken as the target output values TargetOut.

$$TargetOut = cmyk_T$$

If the relative values $\Delta cmyk_{T-p}$ of the adjustment target T0 are present, the target output values TargetOut are found through the following equation along with the adjustment target color values $cmyk_p$.

$$TargetOut = cmyk + \Delta cmyk_{T-p}$$

After calculating the target output values TargetOut, the host device 100 acquires input values Input_P in the device link table 631 and adjustment target values TargetOut_P for the adjustment points P0 (S308). This is done to adjust the correspondence relationship between the input values and the output values in the device link table 631. When information based on the designated intent is in the profile, color conversion is carried out according to the information based on the designated intent. As an equation, this is expressed as follows.

$$Input\_P = CMYK_{in}$$

$$TargetOut\_P = TargetOut$$

Current output values CurrentOut_P in the device link table 631 are adjustment target color values $cmyk_p$, which are the current output values in the device link table 631.

$$CurrentOut\_P = cmyk_p$$

When the relative values of the adjustment target T0 are expressed by the cmyk color space (CS2), this becomes TargetOut_P−CurrentOut_P.

After acquiring the input values Input_P and the adjustment target values TargetOut_P, in S310 to S312, the host device 100 adjusts the adjustment range A0 of the device link table 631 based on the adjustment target T0.

First, referring to FIGS. 14A and 14B, the concept of adjusting the device link table 631 in the adjustment range A0 will be described. Here, in FIGS. 14A and 14B, the horizontal axis represents input values along a given coordinate axis of the CMYK color space (CS1), and the vertical axis represents output values along a given coordinate axis of the cmyk color space (CS2). In other words, the horizontal axis serves as the C axis, the M axis, the Y axis, or the K axis, while the vertical axis serves as the c axis, the m axis, the y axis, or the k axis. The white circles on the horizontal axis represent grid points GD0.

Figure 14A:
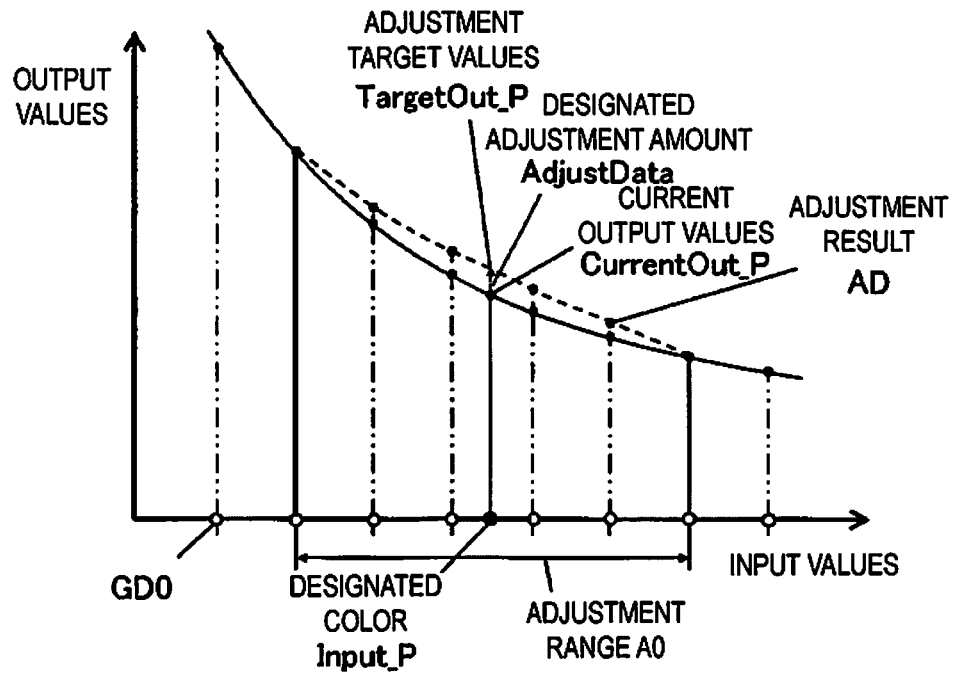
FIG. 14A is a diagram schematically illustrating adjustment amounts at each of grid points in the case of adjustment in an output color space of a device link profile.

FIG. 14A schematically illustrates adjustment amounts AD for the grid points GD0 when adjusting the output values. The adjustment points P0 designated by the user correspond to the input values Input_P. When the user designates adjustment amounts AdjustData as the adjustment target T0, the adjustment target values TargetOut_P obtained by adding the adjustment amounts AdjustData to the current output values CurrentOut_P corresponding to the input values Input_P are set.

The adjustment range A0 is set in the adjustment amounts AdjustData through inputs made in the adjustment range designation field 850, the target acceptance area 840, and the like illustrated in FIG. 9. Basically, the adjustment amounts of the output values with respect to the input values Input_P are maximized so that the adjustment amount is set to 0 at the boundaries of the adjustment range A0. However, because the actual adjustment is performed on the grid points GD0 in the device link table 631, the adjustment may affect a broader range than the set adjustment range A0.

Figure 14B:
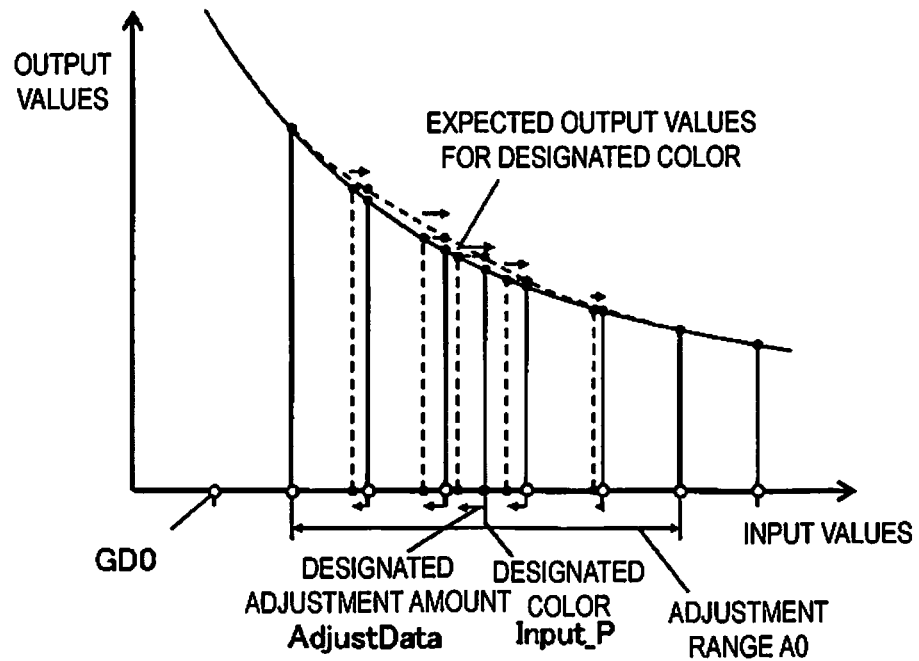
FIG. 14B is a diagram schematically illustrating adjustment amounts at each of grid points in the case of adjustment in an input color space of the device link profile.

FIG. 14B schematically illustrates adjustment amounts AD for the grid points GD0 when adjusting the input values. The adjustment points P0 designated by the user correspond to the input values Input_P. When the user designates the adjustment amounts AdjustData as the adjustment target T0, the output values corresponding to the input values Input_P+AdjustData obtained by adding the adjustment amounts AdjustData to the input values Input_P become the expected output values at the user-designated adjustment point P0.

The correction described above is performed for all coordinate axes of the CMYK color space (CS1) and all the coordinate values of the cmyk color space (CS2).

Next, an example of setting the adjustment amounts AD at the grid points GD0 of the adjustment range A0 will be described with reference to FIGS. 15A and 15B. Here, in FIGS. 15A and 15B, the horizontal axis represents the input values, which are the CMYK values, and the vertical axis represents the adjustment amounts AD of the output values, which are the cmyk values. In addition, triangles on the horizontal axis represent grid points (excluding nearest grid points GDnearest) in the adjustment range A0, and squares on the horizontal axis represent grid points at which output values out of the adjustment range A0 are not modified.

Figure 15A:
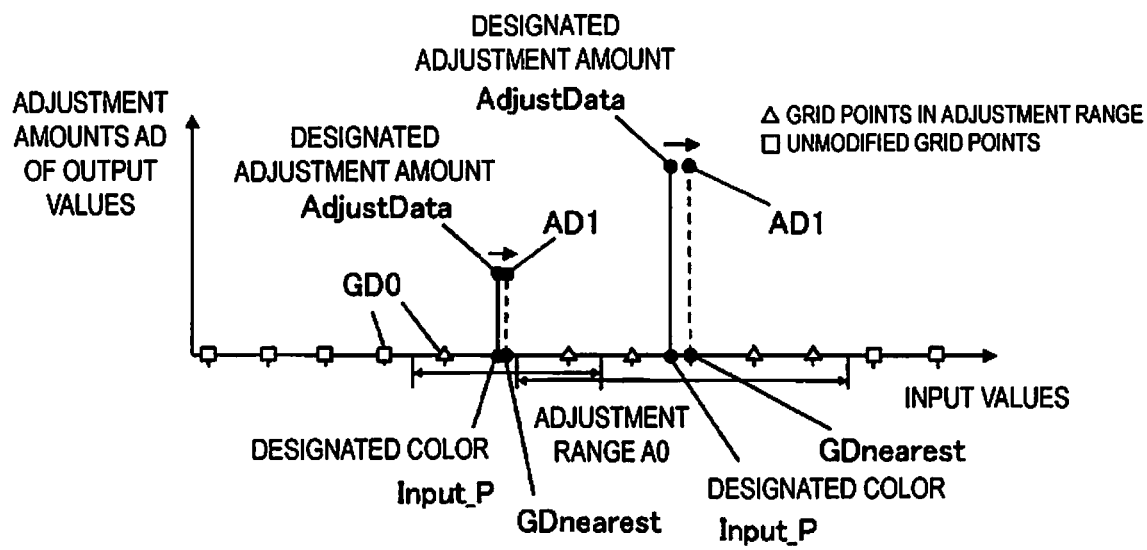
FIG. 15A is a diagram schematically illustrating an example of determining adjustment amounts of output values with respect to nearest grid points.

First, as illustrated in FIG. 15A, for each adjustment point P0, the host device 100 determines adjustment amounts AD1 of the output values with respect to the nearest grid point GDnearest that is the closest grid point to the adjustment point P0 (S310 in FIG. 12). FIG. 15A illustrates an example of determining the adjustment amounts AD1 of the output values when two adjustment points P0 (input values Input_P) are designated on a given coordinate axis of the input color space CS4, which is the CMYK color space (CS1). In the example of FIG. 15A, the adjustment amounts AdjustData for the input values Input_P are used as-is as the adjustment amounts AD1 of the output values with respect to the nearest grid point GDnearest. Of course, this technique is not limited to setting the adjustment amounts AD1 of the output values with respect to the nearest grid point GDnearest to the adjustment amounts AdjustData.

It should be noted that the nearest grid point GDnearest of a plurality of adjustment points near each other may be the same. In this case, for example, the adjustment amounts AdjustData of the adjustment points may be averaged at a ratio inversely proportional to the distance from the nearest grid point GDnearest to the respective adjustment points in the input color space CS4.

Figure 15B:
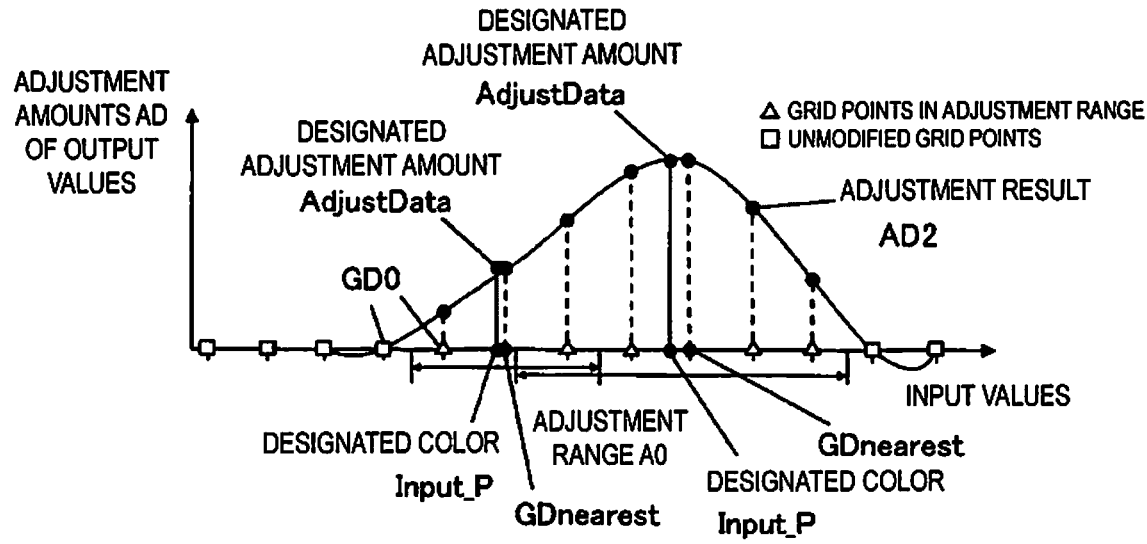
FIG. 15B is a diagram schematically illustrating an example of determining adjustment amounts of output values with respect to grid points in the periphery of nearest grid points.

After determining the adjustment amounts AD1 of the output values with respect to the nearest grid point GDnearest, the host device 100 determines adjustment amounts AD2 of the output values with respect to grid points (the grid points indicated by the triangles) in the periphery of the nearest grid point GDnearest in the adjustment range A0, as illustrated in FIG. 15B (S312 in FIG. 12). For example, the adjustment amounts AD2 of the output values with respect to the grid points in the periphery can be determined by setting the adjustment amounts to 0 for the output values with respect to the grid points outside the adjustment range A0, setting the adjustment amounts AD1 of the output values with respect to the above-described nearest grid point GDnearest to AdjustData, and carrying out an interpolation operation using a four-dimensional tertiary spline function. By carrying out such an interpolation operation, the adjustment amounts AD2 of the output values with respect to the grid points in the periphery are smoothly connected between the adjustment amounts AD1 of the output values with respect to the nearest grid points GDnearest and the adjustment amount "0" of the output values with respect to the grid points out of the adjustment range A0.

Of course, this technique is not limited to using a spline function for the interpolation operation.

Because the targets of the adjustment amounts AD are the grid points, when a plurality of adjustment points are nearby, there are situations where the same grid points are referred to when color-converting the input colors of these adjustment points in accordance with the device link table 631. With such grid points, the adjustment amounts AdjustData of the respective adjustment points are averaged and then adjusted.

After the adjustment amounts AD of the output values with respect to the grid points in the adjustment range A0 have been determined, the host device 100 reflects the determined adjustment amounts AD in the device link table 631 (S314 of FIG. 12). In other words, for each of the grid points in the adjustment range A0, a value obtained by adding the adjustment amount AD to the current output value may be written into the device link table 631 as the updated output value. For example, the output color space CS5 of the device link profile 630 is the cmyk color space, and thus the adjustment amounts ($\Delta$cq, $\Delta$mq, $\Delta$yq, $\Delta$kq) are added to the current output values (cq, mq, yq, kq), and the obtained values (cq+$\Delta$cq, mq+$\Delta$mq, yq+$\Delta$yq, kq+$\Delta$kq) are taken as the updated output values. Here, the variable q is a variable for identifying the grid points in the adjustment range A0.

As described above, in the second color space CS2, the correspondence relationship of the device link profile 630 is adjusted so that the current adjustment target color values $cmyk_p$ become closer to the target output values TargetOut. When information based on a designated intent is present in the device link profile 630, the device link profile 630 is adjusted with respect to the correspondence relationship based on the designated intent.

After the device link profile 630 has been updated, the host device 100 finds, for each adjustment point P0 input to the target acceptance area 840, the current adjustment target color values $cmyk_p$, using the updated device link table 631

(S316). The updated adjustment target color values $cmyk_p$ can be calculated using the same equations as in the process of S304. When information based on the designated intent is in the profile, color conversion is carried out according to the information based on the designated intent.

Additionally, the host device 100 finds a difference d between the updated adjustment target color values $cmyk_p$ and the target output values TargetOut, for the respective adjustment points P0 input in the target acceptance area 840 (S318). This difference can be, for example, a Euclidean distance between points corresponding to the adjustment target color values $cmyk_p$ in the cmyk color space (CS2) and points corresponding to the target output values TargetOut.

Then, the host device 100 determines whether or not conditions for ending the repeated processes of S308 to S320 have been satisfied (S320), repeats the processes of S308 to S320 if the conditions for ending have not been satisfied, and advances the processing to S322 if the conditions for ending have been satisfied. For example, the conditions for ending can be considered to be satisfied when the difference d is less than or equal to a prescribed threshold for all of the adjustment points P0. Alternatively, the conditions for ending may be considered to be satisfied upon a prescribed number being reached.

If the conditions for ending have been satisfied, the host device 100 stores the adjusted device link table 631 in the device link profile 630, stores that device link profile 630 in the storage device 114 (S322), and terminates the profile adjustment process. In this manner, based on the A2B table 622 and the adjustment target T0, the device link table 631 is adjusted in accordance with the current device link table 631 so that the adjustment target color values $cmyk_p$ obtained from the input coordinate values, which correspond to the adjustment point P0, become closer to the target output values TargetOut.

As described above, the A2B table 622 of the output profile 620 used to create the device link table 631 includes the Lab values of the PCS CS3, and thus the device link table 631 can be adjusted taking the coordinates in the PCS CS3 as a reference. Thus, this specific example can make the adjustment of a device link profile easy.

Additionally, the device link table 631 is adjusted using coordinate values expressing the output colors ($cmyk_p$) as a reference, and thus the specific example can adjust the device link profile so that the profile has good color reproduction accuracy. At this time, the solution $≠cmyk_b$ of the adjustment color values Δcmyk, optimized so that a difference (relative value $\Delta Lab_{T-p}$) of the adjustment target T0, which uses the Lab color space (CS3) expressing the colors of the patches in the color charts CH0 and CH1 as a reference, becomes as low as possible, is used. Accordingly, the device link profile can be adjusted so that the color reproduction accuracy is even better.

(6) Modified Examples:

Various modified examples are conceivable in the invention.

For example, the output device is not limited to an ink jet printer, and may be an electrophotographic-type printer such as a laser printer using toner as the color materials, a three-dimensional printer, a display device, and the like.

The types of the color materials forming the images are not limited to C, M, Y, and K. In addition to C, M, Y, and K, Dy (dark yellow), Or (orange), and Gr (green) which are darker than Lc, Lm, and Y, Lk (light black) which is lighter than K, colorless color materials for improving image quality, and the like may be included as well.

Of course, the second color space is not limited to the cmyk color space, and may be the CMY color space, the RGB color space, and the like.

The target device is not limited to a target printing press, and may be a display device and the like.

Of course, the first color space is not limited to the CMYK color space, and may be the CMY color space, the RGB color space, and the like.

The above-described processes can be changed as appropriate, such as by rearranging the order. For example, in the device link profile creation process of FIG. 6, the process of accepting the output profile 620 in S804 can be carried out before the process of S802 or after the process of S806. Additionally, in the optimization process of FIG. 10, at least part of the processing for calculating the color difference square $\Delta E_{00}^2$ in S212 to S216 can be carried out after the process of S218 or S220.

Additionally, the process of calculating the cost C in S220 may be omitted, and the target function $y=\Delta E_{00}^2+w\times V^2$ may be calculated in the calculation process of S222. In this case too, the color reproduction accuracy of the device link profile 630 can be improved by setting, as the optimal solution $\Delta cmyk_b$, the optimal solution candidates $\Delta cmyk_{pb}$ for when the values of the target functions y obtained from the plurality of initial values $\Delta cmyk_i$ are the lowest, in the optimal solution determination process of S232.

Furthermore, the process of calculating the square $V^2$ of the magnitudes of the vectors of the adjustment color values Δcmyk in S218 may be omitted, and the target function $y=\Delta E_{00}^2$, or $y=\Delta E_{00}^2+C$ may be calculated in the calculation process of S222. In this case too, the color reproduction accuracy of the device link profile 630 can be improved by setting, as the optimal solution $\Delta cmyk_b$, the optimal solution candidates $\Delta cmyk_{pb}$ for when the values of the target functions y obtained from the plurality of initial values $\Delta cmyk_i$ are the lowest, in the optimal solution determination process of S232.

Furthermore, even if the initial values $\Delta cmyk_i$ of the adjustment color values Δcmyk are consolidated as (Δci, Δmi, Δyi, Δki)=(0, 0, 0, 0) and the like, the optimal solution $\Delta cmyk_b$ of the adjustment color values Δcmyk at which the difference (relative value $\Delta Lab_{T-p}$) of the adjustment target T0, using the PCS CS3 as a reference, becomes the lowest, can be obtained. The color reproduction accuracy of the profile can be improved by adjusting the profile using the optimal solution $\Delta cmyk_b$.

Although the location where the color conversion table of the original profile used to create the device link table 631 is stored is preferably the device link profile 630, the location is not limited to the device link profile 630. For example, the original profile may be stored in the storage device 114, and the original profile information expressed by the original profile may be stored in the private tags 523 of the device link profile 630.

Figure 17:
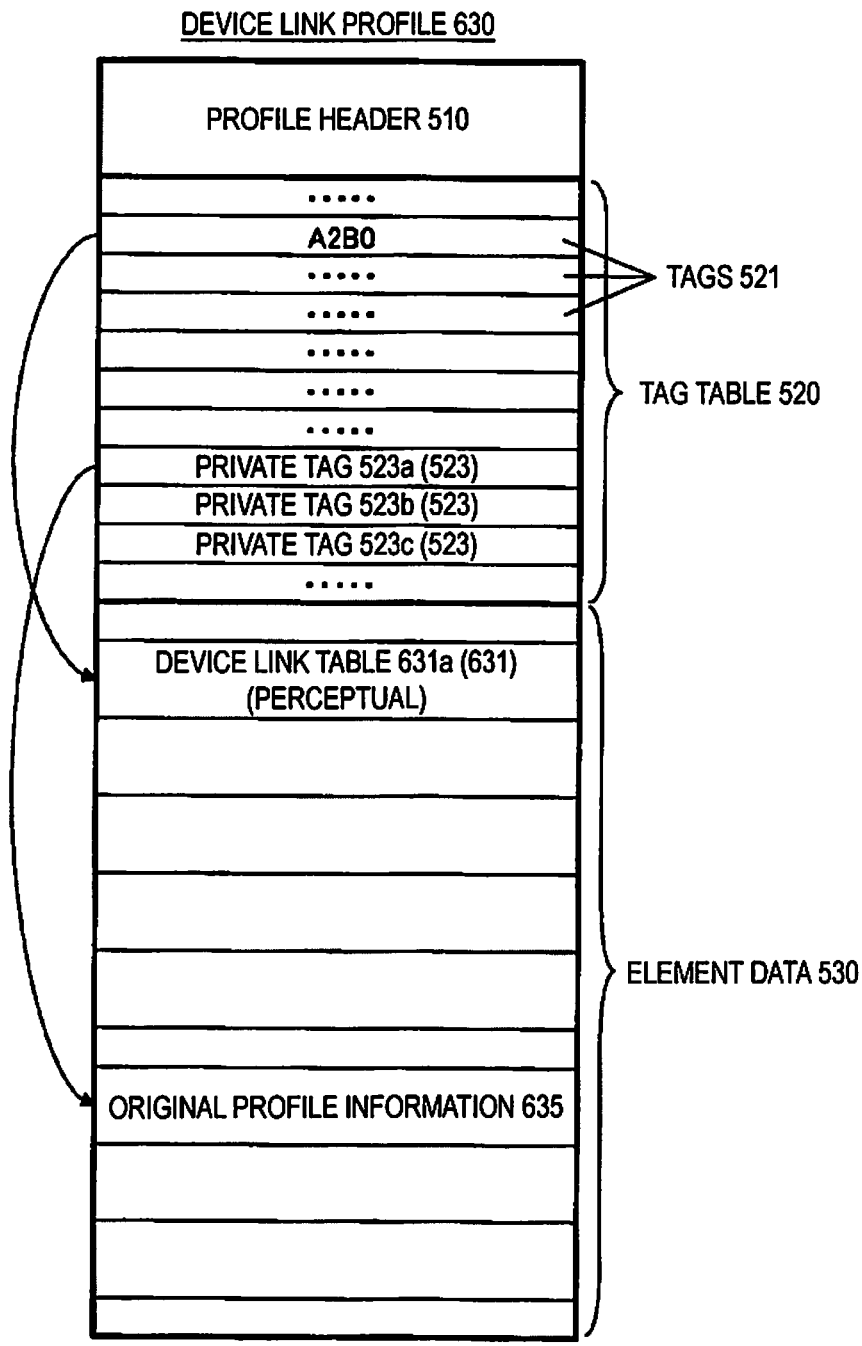
FIG. 17 is a diagram schematically illustrating another example of the structure of a device link profile.

FIG. 16 illustrates an example of a device link profile creation process that stores the original profile information in the private tags 523. The device link profile creation process illustrated in FIG. 16 replaces S814 to S816 in the device link profile creation process of FIG. 6 with S822 to S824. In FIG. 16, S802 to S812 indicated in FIG. 6 are illustrated as a single entity. FIG. 17 schematically illustrates an example of the structure of the device link profile 630 created through the device link profile creation process illustrated in FIG. 16. Here, steps S822 to S824 in FIG. 16 correspond to the storage step ST1, the storage function FU1, and the storage unit U1.

Once the device link profile creation process illustrated in FIG. 16 is started and the generated device link table 631 is stored in the device link profile 630 (S802 to S812), the host device 100 acquires original profile information 635 (S822). The original profile information 635 is information expressing the output profile 620, which is the original profile, and one example that can be given is the filename of the output profile 620. For example, if the filename of the output profile 620 serving as the original profile is "OutputProfile1.icc", the original profile information 635 is "OutputProfile1.icc". A description tag included in the output profile 620 may be used as the original profile information 635 instead of the filename. The description tag of the profile 500 is the location where information denoting an overview of the profile 500 is stored. For example, if "OutputProfile1" is denoted in the description tag of the output profile 620 serving as the original profile, the original profile information 635 is "OutputProfile1".

Next, the host device 100 stores the original profile information 635 in the private tags 523 of the device link profile 630 (S824), and then terminates the device link profile creation process. FIG. 17 illustrates a case where the original profile information 635 is stored in the private tag 523a of the device link profile 630.

FIG. 18 illustrates an example of the target setting process using the A2B table 622 of the output profile 620 based on the original profile information 635. The target setting process illustrated in FIG. 18 replaces S122 in the target setting process of FIG. 8 with S132 to S134. In FIG. 18, S102 to S110 of FIG. 8 are illustrated as a single entity. Here, S132 to S134 and S124 to S126 correspond to the conversion step ST11 included in the adjustment step ST4, the conversion function FU11 included in the adjustment function FU4, and the conversion unit U11 included in the adjustment unit U4.

Once the target setting process is started and the operation of a field, a button, or the like in the UI screen 800 illustrated in FIG. 9 is accepted (S102 to S110), if the adjustment target color space CS6 is the PCS CS3 (YES in S120), the host device 100 carries out the processes of S132 to S134 and S124 to S126.

First, in S132, the host device 100 reads out the device link table 631 from the device link profile 630 (see FIG. 17), and furthermore reads out the original profile information 635 from the private tags 523 of the device link profile 630. Next, the host device 100 reads out, from the storage device 114, the A2B table 622 of the output profile 620, which serves as the original profile indicated by the original profile information 635 (S134). For example, if the original profile information 635 is the filename "OutputProfile1.icc", the A2B table 622 of the output profile 620 having a filename of "OutputProfile1.icc" may be read out. If the original profile information 635 is the description tag"OutputProfile1", the A2B table 622 of the output profile 620 including the description tag "OutputProfile1" may be read out. The original profile information 635 is information indicating the original profile used to create the device link table 631, and thus the relationship between the device link table 631 and the A2B table 622 in the original profile is maintained.

After the process of S134, the host device 100 converts the CMYK values $CMYK_{in}$ at the adjustment point P0 into the adjustment target color values $cmyk_p$ in accordance with the device link table 631 of the device link profile 630 (S124). Next, in S126, the host device 100 converts the above-described adjustment target color values $cmyk_p$ into the adjustment target PCS values $Lab_{S2}$, in accordance with the A2B table 622 of the output profile 620. Then, the device link table 631 is adjusted based on the A2B table 622 and the adjustment target T0 by carrying out the optimization process illustrated in FIG. 10 and the profile adjustment process illustrated in FIG. 12.

As described thus far, the relationship between the device link table 631 and the A2B table 622 in the original profile is maintained, which helps prevent needing to redo the adjustment task due to operational mistakes.

Of course, the storage location of the original profile is not limited to the storage device 114 of the host device 100, and may instead be a storage medium, an external device connected over a network, or the like from which data is read by the host device 100.

The original profile associated with the device link table 631 is not limited to the output profile 620, and may be the input profile 610, or both the input profile 610 and the output profile 620. The original profile associated with the device link table 631 is not limited to the A2B table 622 of the output profile 620, and may be the A2B table 611 of the input profile 610, the B2A table 621 of the output profile 620, the B2A table of the input profile 610, a combination of these color conversion tables, or the like.

FIG. 19 schematically illustrates an example of the structure of the device link profile 630 storing the A2B table 611 of the input profile 610, the B2A table 621 of the output profile 620, and the A2B table 622 of the output profile 620. Note that the original profiles used to create the device link table 631 are the input profile 610 and the output profile 620, and the original profile has three types of color conversion tables, namely the conversion tables 611, 621, and 622.

Figure 20:
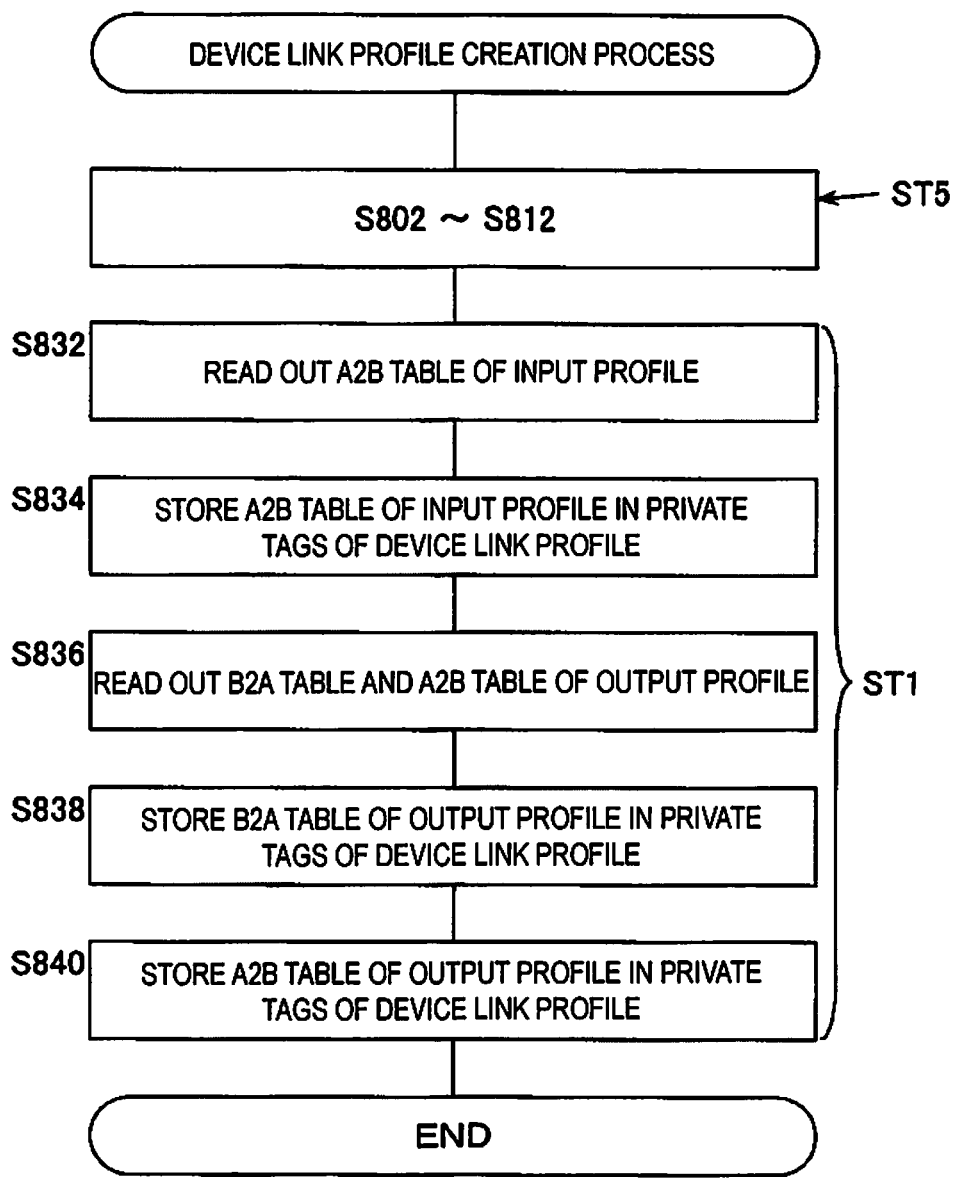
FIG. 20 is a flowchart illustrating another example of a device link profile creation process.

FIG. 20 illustrates an example of the device link profile creation process that stores the above-described conversion tables 611, 621, and 622 in the private tags 523. The device link profile creation process illustrated in FIG. 20 replaces S814 to S816 of the device link profile creation process illustrated in FIG. 6 with S832 to S840. In FIG. 20, too, S802 to S812 of FIG. 6 are illustrated as a single entity. Here, steps S832 to S840 correspond to the storage step ST1, the storage function FU1, and the storage unit U1.

Once the device link profile creation process is started and the generated device link table 631 is stored in the device link profile 630 (S802 to S812), the host device 100 loads, into the RAM 113, the A2B table 611 from the input profile 610 used to create the device link table 631 (S832). Next, the host device 100 stores the A2B table 611 in the private tag 523a of the device link profile 630 (S834). Additionally, the host device 100 loads, into the RAM 113, the B2A table 621 and the A2B table 622 from the output profile 620 used to create the device link table 631 (S836). Next, the host device 100 stores the B2A table 621 in the private tag 523b of the device link profile 630 (S838). Furthermore, the host device 100 stores the A2B table 622 in the private tag 523c of the device link profile 630 (S840), and terminates the device link profile creation process. FIG. 19 illustrates a situation where, in the device link profile 630, the A2B table 611 is stored in the private tag 523a, the B2A table 621 is stored in the private tag 523b, and the A2B table 622 is stored in the private tag 523a.

Figure 21:
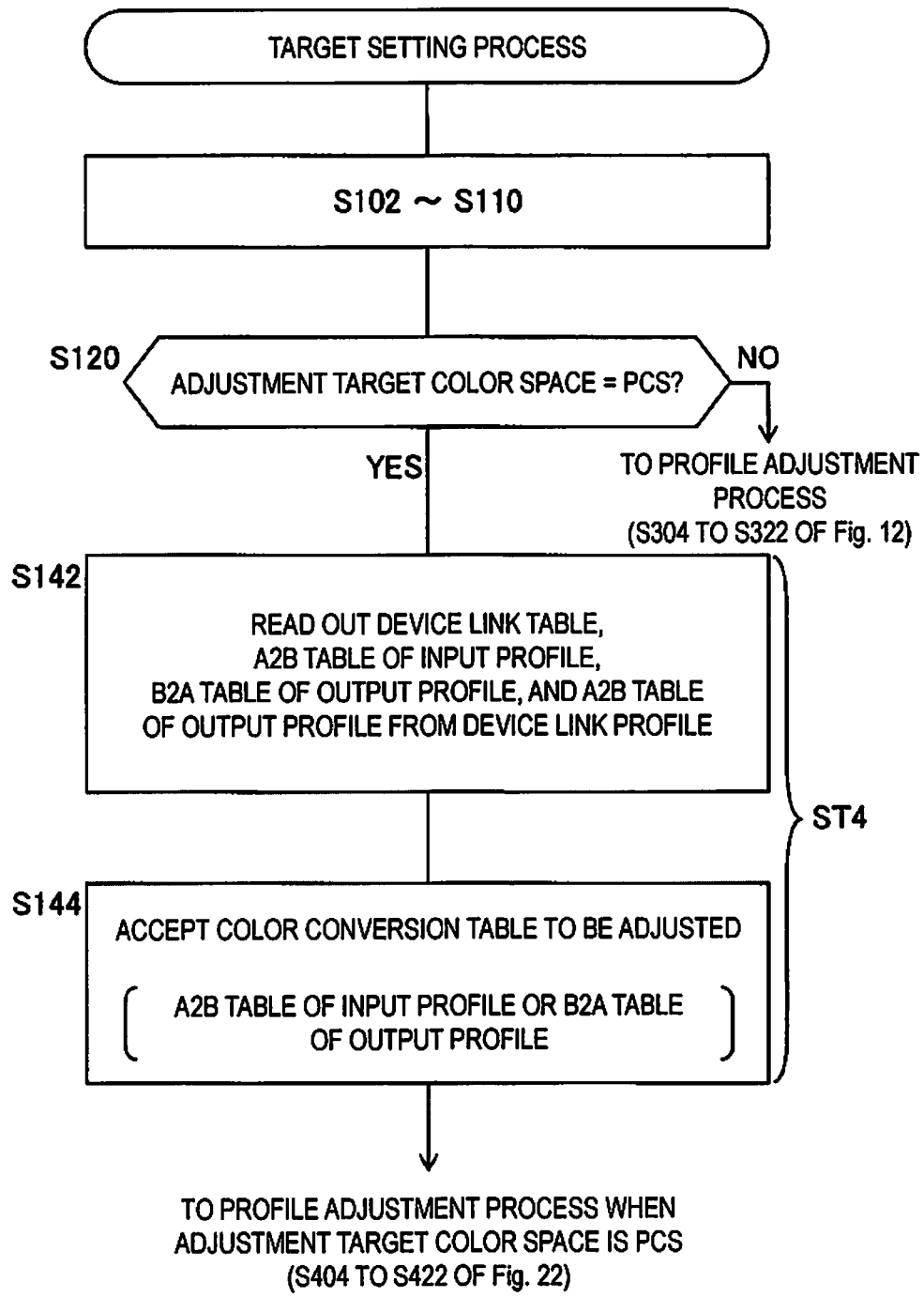
FIG. 21 is a flowchart illustrating another example of a target setting process.

FIG. 21 illustrates an example of the target setting process using the device link profile 630 storing the above-described conversion tables 611, 621, and 622. The target setting process illustrated in FIG. 21 replaces S122 to S126 of the target setting process illustrated in FIG. 8 with S142 to S144. In FIG. 21, too, S102 to S110 of FIG. 8 are illustrated as a single entity. Here, S142 to S144 correspond to the adjustment step ST4, the adjustment function FU4, and the adjustment unit U4.

Once the target setting process is started and an operation of a field, a button, or the like is accepted through the UI screen 800 illustrated in FIG. 9 (S102 to S110), the process branches depending on whether the adjustment target color space CS6 is the PCS CS3 (S120). When the adjustment target color space CS6 is the PCS CS3, the host device 100 carries out the processes of S142 and the subsequent steps. When the adjustment target color space CS6 is the CMYK color space (CS1) or the cmyk color space (CS2), the host device 100 carries out the profile adjustment process illustrated in FIG. 12, without carrying out the processes of S142 and the subsequent steps. The profile adjustment process has been described above and thus will not be mentioned here.

In S142, the host device 100 reads out the device link table 631 from the device link profile 630 (see FIG. 19), and furthermore reads out the conversion tables 611, 621, and 622 from the private tags 523*a*, 523*b*, and 523*c* of the device link profile 630. The conversion tables 611, 621, and 622 are color conversion tables of the original profile used to create the device link table 631, and thus the relationship between the device link table 631 and the conversion tables 611, 621, and 622 in the original profile is maintained.

It is assumed here that one of the A2B table 611 of the input profile 610 and the B2A table 621 of the output profile 620 is the color conversion table to be adjusted. The host device 100 accepts, through the input device 115, one of the conversion tables 611 and 622 as the color conversion table to be adjusted (S144), and carries out the profile adjustment process illustrated in FIG. 22 without carrying out the optimization process illustrated in FIG. 10.

Figure 22:
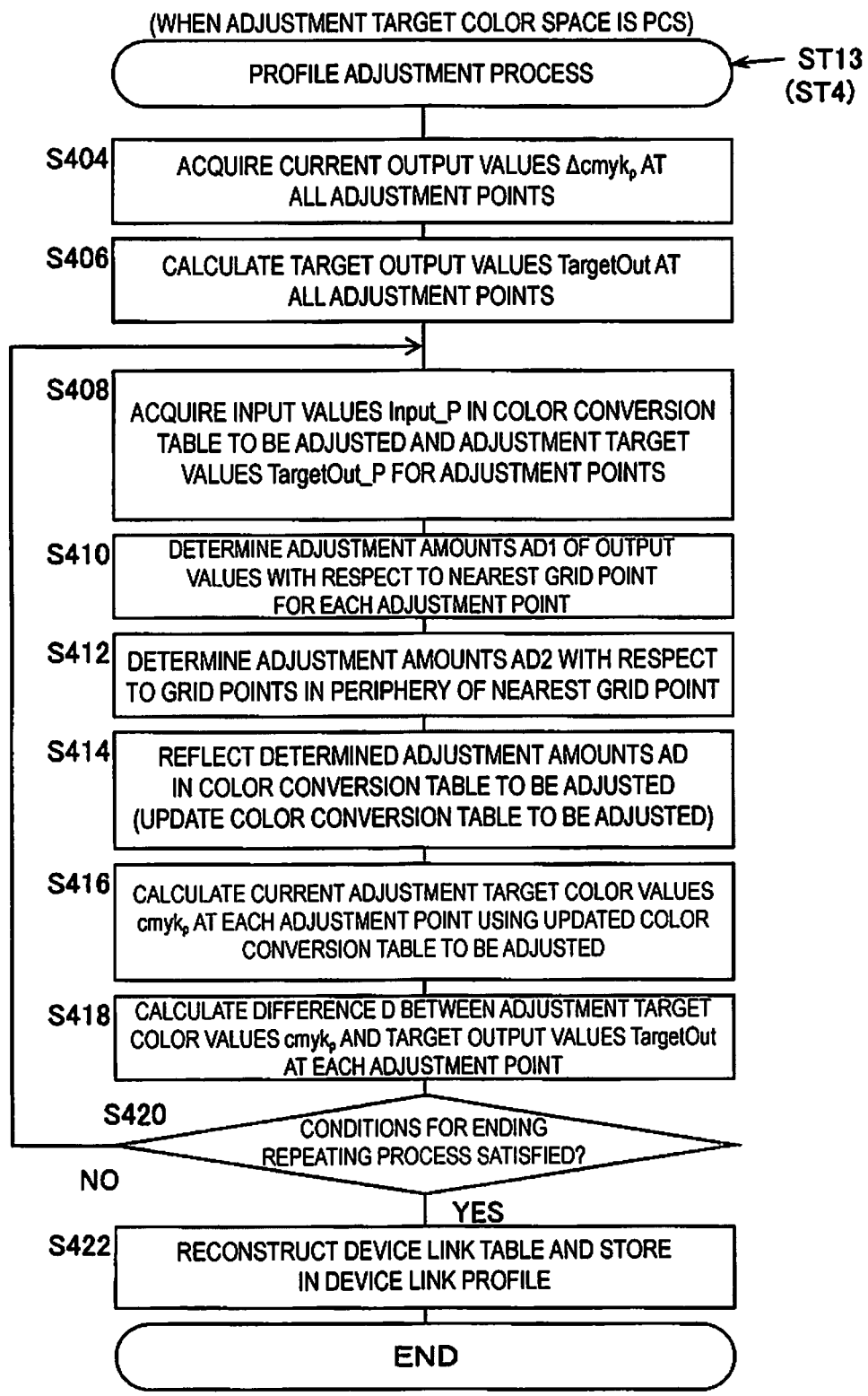
FIG. 22 is a flowchart illustrating another example of a profile adjustment process.

FIG. 22 illustrates an example of the profile adjustment process when the adjustment target color space CS6 is the PCS CS3. Of course, this profile adjustment process corresponds to the adjustment step ST4, the adjustment function FU4, and the adjustment unit U4.

First, the host device 100 acquires the adjustment target color values $cmyk_p$, which are the current output values, for each adjustment point P0 input in the target acceptance area 840 (S404). The adjustment target color values $cmyk_p$ can be calculated through the following equation, using the input values $CMYK_{in}$.

$$cmyk_p = f_{icc}(DLProfile, A2B0, CMYK_{in})$$

After the adjustment target color values $cmyk_p$ have been obtained, the host device 100 finds the target output values TargetOut for the adjustment points P0 input in the target acceptance area 840 (S406). The target output values TargetOut can be calculated through the following equation, using the adjustment amounts $AdjustData = \Delta Lab_{T-p}$, which takes the PCS CS3 as a reference.

$$TargetOut = f_{icc}(OutputProfile, B2A, f_{icc}(InputProfile, A2B, CMYK_{in}) + \Delta Lab_{T-p})$$

In the first argument, InputProfile represents the input profile, and OutputProfile represents the output profile. The above-described equation means that the input values $CMYK_{in}$ are converted into the PCS values $Lab_{S1}$ in accordance with the A2B table 611 of the input profile 610, and values obtained by adding the adjustment amount $\Delta Lab_{T-p}$ to the PCS values $Lab_{S1}$ are converted in accordance with the B2A table 621 of the output profile 620.

After calculating the target output values TargetOut, the host device 100 acquires the input values Input_P in the color conversion table to be adjusted (the A2B table 611 or the B2A table 621), and the adjustment target values TargetOut_P, for each of the adjustment points P0 (S408). This is done to adjust the correspondence relationship between the input values and the output values in the color conversion table to be adjusted.

When the A2B table 611 of the input profile 610 is to be adjusted, this is expressed through the following equations.

$$Input\_P = CMYK_{in}$$

$$TargetOut\_P = f_{icc}(OutputProfile, A2B, TargetOut)$$

The adjustment target values TargetOut_P (Lab values) of the A2B table 611 in the input profile 610 are found from the target output values TargetOut (cmyk values) in order to carry out adjustment taking the output colors $cmyk_p$, corresponding to the colors of the output image IM0, as a reference.

The current output values CurrentOut_P (Lab values) in the A2B table 611 are expressed by the following equation.

$$CurrentOut\_P = f_{icc}(InputProfile, A2B, CMYK_{in})$$

When the relative values of the adjustment target T0 are expressed by the PCS CS3, which is the output color space of the A2B table 611, this becomes TargetOut_P−CurrentOut_P.

When the B2A table 621 of the output profile 620 is to be adjusted, this is expressed through the following equations.

$$Input\_P = f_{icc}(InputProfile, A2B, CMYK_{in})$$

$$TargetOut\_P = TargetOut$$

Additionally, the current output values CurrentOut_P (cmyk values) in the B2A table 621 are the current output values CurrentOut of the device link table 631.

$$CurrentOut\_P = CurrentOut$$

When the relative values of the adjustment target T0 are expressed by the cmyk color space (CS2), which is the output color space of the B2A table 621, this becomes TargetOut_P−CurrentOut_P.

After acquiring the input values Input_P and the adjustment target values TargetOut_P, in S410 to S412, the host device 100 adjusts the adjustment range A0 of the color conversion table to be adjusted (611 or 622) based on the adjustment target T0. First, as illustrated in FIG. 15A, for each adjustment point P0, the host device 100 determines adjustment amounts AD1 of the output values with respect to the nearest grid point GDnearest that is the closest grid point to the adjustment point P0 (S410 in FIG. 22). After determining the adjustment amounts AD1 of the output values with respect to the nearest grid point GDnearest, the host device 100 determines adjustment amounts AD2 of the output values with respect to grid points (the grid points indicated by the triangles) in the periphery of the nearest grid point GDnearest in the adjustment range A0, as illustrated in FIG. 15B (S412 in FIG. 22).

After the adjustment amounts AD of the output values with respect to the grid points in the adjustment range A0 have been determined, the host device 100 reflects the determined adjustment amounts AD in the color conversion table to be adjusted (S414 of FIG. 22). After the color conversion table has been updated, the host device 100 finds, for each adjustment point P0 input to the target acceptance area 840, the current adjustment target color values $cmyk_p$, using the updated color conversion table (611 or 622) (S416). The device link table 631 is not updated, and thus the current adjustment target color values $cmyk_p$ are calculated using the A2B table 611 and the B2A table 621. If the A2B table 611 is to be adjusted, the A2B table 611 is the updated color conversion table, whereas if the B2A table 621 is to be adjusted, the B2A table 621 is the updated color conversion table.

$$cmyk_p = f_{icc}(\text{OutputProfile}, B2A, f_{icc}(\text{InputProfile}, A2B, CMYK_{in}))$$

Additionally, the host device 100 finds a difference d between the updated adjustment target color values $cmyk_p$ and the target output values TargetOut, for each adjustment point P0 input in the target acceptance area 840 (S418). This difference can be, for example, a Euclidean distance between points corresponding to the adjustment target color values $cmyk_p$ in the cmyk color space (CS2) and points corresponding to the target output values TargetOut.

Then, the host device 100 determines whether conditions for ending the repeated processes of S408 to S420 have been satisfied (S420), repeats the processes of S408 to S420 if the conditions for ending have not been satisfied, and advances the processing to S422 if the conditions for ending have been satisfied. For example, the conditions for ending can be considered to be satisfied when the difference d is less than or equal to a prescribed threshold for all of the adjustment points P0. Alternatively, the conditions for ending may be considered to be satisfied upon a prescribed number being reached.

If the conditions for ending have been satisfied, the host device 100 reconstructs the device link table 631 and stores the table in the device link profile 630, stores that device link profile 630 in the storage device 114 (S422), and terminates the profile adjustment process. The process of reconstructing the device link table 631 is a process of combining the conversion tables 611 and 622 after the adjustment processes of S404 to S420, and can be carried out in accordance with S810 to S812 of the device link profile creation process illustrated in FIG. 6. For example, the host device 100 may first convert the PCS values $L_i$, $a_i$, and $b_i$, which are the output values of the grid points GD1 in the A2B table 611 of the input profile 610, in accordance with the B2A table 621 of the output profile 620. The host device 100 may then generate the device link table 631 by associating the CMYK values $C_i$, $M_i$, $Y_i$, and $K_i$ with the cmyk values $c_j$, $m_j$, $y_j$, and $k_j$ for each of the grid points GD1. Note that this reconstruction of the device link table 631 is also included in the adjustment of the device link table 631.

As described above, based on the conversion tables 611, 621, and 622 and the adjustment target T0, the device link table 631 is adjusted in accordance with the current device link table 631 so that the adjustment target color values $cmyk_p$ obtained from the input coordinate values, which correspond to the adjustment point P0, become closer to the target output values TargetOut. Here, the conversion tables 611, 621, and 622 of the original profile used to create the device link table 631 include the Lab values of the PCS CS3, and thus the device link table 631 can be adjusted taking the coordinates in the PCS CS3 as a reference. Thus, this specific example can make the adjustment of a device link profile easy.

Note that this technique can be applied even when the device link profile 630 does not include the A2B table 622 of the output profile 620, and two types of tables, namely the A2B table 611 of the input profile 610 and the B2A table 621 of the output profile 620, are stored. In this case, the adjustment amounts $\text{AdjustData} = \Delta Lab_{T\text{-}p}$ may be added to the PCS values $Lab_{S1} = F_{icc}(\text{InputProfile}, A2B, CMYK_{in})$ when acquiring the adjustment target values TargetOut_P in the process of S408.

$$\text{TargetOut\_P} = f_{icc}(\text{InputProfile}, A2B, CMYK_{in}) + \Delta Lab_{T\text{-}p}$$

Accordingly, in the device link profile creation process of FIG. 20, it is possible to read out only the B2A table 621 from the output profile 620 in the process of S836, which eliminates the process of S840. Additionally, in the target setting process of FIG. 21, the process of reading out the A2B table 622 from the device link profile 630 in the process of S142 can be eliminated as well.

Note that the adjustment target color space CS6 may be fixed to the PCS CS3. In this case, in the target setting process of FIG. 8, the process of accepting the adjustment target color space CS6 in S112 and the determination process of S120 can be eliminated, and in S110, the host device 100 may advance the processing to S122 upon accepting an operation on the execute adjustment button 870. The same applies to the target setting processes illustrated in FIGS. 18 and 21, such that in the target setting process of FIG. 18, the process of S132 may be carried out after the process of S110, and in the target setting process of FIG. 21, the process of S142 may be carried out after the process of S110. Both cases are also included in this technique.

(7) Conclusion:

As described thus far, according to the invention, a technique and the like that make it easy to adjust a device link profile can be provided through various aspects. Of course, the above-described basic actions and effects are achieved by techniques implemented using only the constituent elements of the independent claims.

Additionally, configurations in which the configurations disclosed in the above-described examples are replaced with each other, or the combinations thereof are changed, configurations in which known techniques and the configurations disclosed in the above-described examples are replaced with each other, or the combinations thereof are changed, and the like are also possible. The invention also includes these configurations and the like.

This application claims priority under 35 U.S.C. § 119 to Japanese Patent Application No. 2017-202797, filed Oct. 19, 2017. The entire disclosure of Japanese Patent Application No. 2017-202797 is hereby incorporated herein by reference.

What is claimed is:

1. A device link profile adjustment method of a computer carrying out a process of adjusting a device link table in a device link profile expressing a correspondence relationship between a first device-dependent color space and a second device-dependent color space, the method comprising:

accepting designation of one adjustment point that has one set of device-dependent coordinate values in the first device-dependent color space, and accepting, for the one adjustment point, an adjustment target that is one set of values in a profile connection space and to which one set of adjustment point device-independent coordinate values in the profile connection space, which is found from the one set of device-dependent coordinate values of the one adjustment point, is to be adjusted, the one set of values of the adjustment target expressing as absolute values one set of adjustment target coordinate values for the one set of adjustment point device-independent coordinate values, or expressing as relative values one set of differences between the one set of adjustment point device-independent coordinate values and the one set of adjustment target coordinate values; and adjusting the device link table that has been created using an input profile associating sets of first coordinate values of the first device-dependent color space with first sets of device-independent coordinate values of the profile connection space, respectively, and an output profile associating second sets of device-independent coordinate values of the profile connection space with sets of second coordinate values of the second device-dependent color space, respectively, and that associates the sets of the first coordinate values with sets of determined second coordinate values, respectively, which have been determined based on the first sets of device-independent coordinate values and the second sets of the device-independent coordinate values, the device link table being adjusted based on the adjustment target and a color conversion table including sets of device-independent coordinate values of the profile connection space of an original profile that is at least one of the input profile or the output profile, or both.

2. The device link profile adjustment method according to claim 1, wherein
the original profile includes the output profile, and
the color conversion table includes a first conversion table used to convert from the sets of the second coordinate values to the second sets of device-independent coordinate values.

3. The device link profile adjustment method according to claim 2, wherein
the original profile includes the input profile and the output profile, and
the color conversion table includes a second conversion table used to convert from the sets of first coordinate values to the first sets of device-independent coordinate values in the input profile, and a third conversion table used to convert from the second sets of device-independent coordinate value to the sets of second coordinate values in the output profile.

4. The device link profile adjustment method according to claim 2, further comprising:
storing the color conversion table in a private tag of the device link profile, wherein
in the adjusting, the color conversion table is read out from the private tag of the device link profile, and the device link table is adjusted based on the color conversion table read out and the adjustment target.

5. The device link profile adjustment method according to claim 2, further comprising:
storing original profile information indicating the original profile in a private tag of the device link profile, wherein
in the adjusting, the original profile information is read out from the private tag of the device link profile, and the device link table is adjusted based on the color conversion table of the original profile indicated by the original profile information read out and the adjustment target.

6. The device link profile adjustment method according to claim 2, further comprising:
accepting at least one of the first device-dependent color space and the second device-dependent color space, and, the profile connection space as an adjustment target color space, wherein
in the accepting of the adjustment target, the adjustment target at the adjustment point, taking the coordinate in the adjustment target color space as a reference, is accepted; and in the adjusting:
in a case where the adjustment target color space is one of the first device-dependent color space and the second device-dependent color space, the device link table of the device link profile is taken as a target, and the device link table is adjusted based on the adjustment target, and
when the adjustment target color space is the profile connection space, the device link table is adjusted based on the adjustment target and the color conversion table.

7. The device link profile adjustment method according to claim 2, wherein the adjusting includes:
converting a set of adjustment target color values that is the set of second coordinate values at the adjustment point into a set of adjustment target PCS values that is the adjustment target device-independent coordinate values in accordance with the first conversion table, PCS of the set of adjustment target PCS values being abbreviation for the profile connection space;
assuming a set of values obtained by adding the one set of differences as the relative values of the adjustment target using the coordinate of the profile connection space as a reference to the set of adjustment target PCS values is a set of target PCS values, assuming a set of values added to the set of adjustment target color values is a set of adjustment color values, and obtaining an optimal solution of the set of adjustment color values by carrying out an optimization process including an element that brings a set of provisional PCS values obtained by converting, in accordance with the first conversion table, a set of provisional color values that is the result of adding the set of adjustment color values to the set of adjustment target color values closer to the set of target PCS values; and
adjusting the device link table based on the optimal solution of the adjustment color values.

8. The device link profile adjustment method according to claim 7, wherein
the original profile includes the input profile and the output profile, and
the color conversion table includes a second conversion table used to convert from the sets of first coordinate values to the first sets of device-independent coordinate values in the input profile, and a third conversion table used to convert from the second sets of device-independent coordinate value to the sets of second coordinate values in the output profile.

9. The device link profile adjustment method according to claim 7, further comprising:
storing the color conversion table in a private tag of the device link profile, wherein
in the adjusting, the color conversion table is read out from the private tag of the device link profile, and the device link table is adjusted based on the color conversion table read out and the adjustment target.

10. The device link profile adjustment method according to claim 7, further comprising:
storing original profile information indicating the original profile in a private tag of the device link profile, wherein
in the adjusting, the original profile information is read out from the private tag of the device link profile, and the device link table is adjusted based on the color conversion table of the original profile indicated by the original profile information read out and the adjustment target.

11. The device link profile adjustment method according to claim 7, further comprising:
accepting at least one of the first device-dependent color space and the second device-dependent color space, and, the profile connection space as an adjustment target color space, wherein
in the accepting of the adjustment target, the adjustment target at the adjustment point, taking the coordinate in the adjustment target color space as a reference, is accepted; and
in the adjusting:
in a case where the adjustment target color space is one of the first device-dependent color space and the second device-dependent color space, the device link table of the device link profile is taken as a target, and the device link table is adjusted based on the adjustment target, and
when the adjustment target color space is the profile connection space, the device link table is adjusted based on the adjustment target and the color conversion table.

12. The device link profile adjustment method according to claim 1, wherein
the original profile includes the input profile and the output profile, and
the color conversion table includes a second conversion table used to convert from the sets of first coordinate values to the first sets of device-independent coordinate values in the input profile, and a third conversion table used to convert from the second sets of device-independent coordinate value to the sets of second coordinate values in the output profile.

13. The device link profile adjustment method according to claim 12, further comprising:
storing the color conversion table in a private tag of the device link profile, wherein
in the adjusting, the color conversion table is read out from the private tag of the device link profile, and the device link table is adjusted based on the color conversion table read out and the adjustment target.

14. The device link profile adjustment method according to claim 12, further comprising:
storing original profile information indicating the original profile in a private tag of the device link profile, wherein
in the adjusting, the original profile information is read out from the private tag of the device link profile, and the device link table is adjusted based on the color conversion table of the original profile indicated by the original profile information read out and the adjustment target.

15. The device link profile adjustment method according to claim 12, further comprising:
accepting at least one of the first device-dependent color space, the second device-dependent color space, and, the profile connection space as an adjustment target color space, wherein
in the accepting of the adjustment target, the adjustment target at the adjustment point, taking the coordinate in the adjustment target color space as a reference, is accepted; and
in the adjusting:
in a case where the adjustment target color space is one of the first device-dependent color space and the second device-dependent color space, the device link table of the device link profile is taken as a target, and the device link table is adjusted based on the adjustment target, and
when the adjustment target color space is the profile connection space, the device link table is adjusted based on the adjustment target and the color conversion table.

16. The device link profile adjustment method according to claim 1, further comprising:
storing the color conversion table in a private tag of the device link profile, wherein
in the adjusting, the color conversion table is read out from the private tag of the device link profile, and the device link table is adjusted based on the color conversion table read out and the adjustment target.

17. The device link profile adjustment method according to claim 1, further comprising:
storing original profile information indicating the original profile in a private tag of the device link profile, wherein
in the adjusting, the original profile information is read out from the private tag of the device link profile, and the device link table is adjusted based on the color conversion table of the original profile indicated by the original profile information read out and the adjustment target.

18. The device link profile adjustment method according to claim 1, further comprising:
accepting at least one of the first device-dependent color space and the second device-dependent color space, and, the profile connection space as an adjustment target color space, wherein
in the accepting of the adjustment target, the adjustment target at the adjustment point, taking the coordinate in the adjustment target color space as a reference, is accepted; and
in the adjusting:
in a case where the adjustment target color space is one of the first device-dependent color space and the second device-dependent color space, the device link table of the device link profile is taken as a target, and the device link table is adjusted based on the adjustment target, and
in a case where the adjustment target color space is the profile connection space, the device link table is adjusted based on the adjustment target and the color conversion table.

19. A device link profile adjustment apparatus that adjusts a device link table in a device link profile expressing a correspondence relationship between a first device-dependent color space and a second device-dependent color space, the apparatus comprising:
a processor configured to execute a plurality of units including
a target acceptance unit configured to accept designation of one adjustment point that has one set of device-dependent coordinate values in the first device-dependent color space, and accept, for the one adjustment point, an adjustment target that is one set of values in a profile connection space and to which one set of adjustment point device-independent coordinate values in the profile connection space, which is found from the one set of device-dependent coordinate values of the one adjustment point, is to be adjusted, the one set of values of the adjustment target expressing as absolute values one set of adjustment target coordinate values for the one set of adjustment point device-independent coordinate values, or expressing as relative values one set of differences between the one set of adjustment point device-independent coordinate values and the one set of adjustment target coordinate values; and an adjustment unit configured to adjust the device link table that has been created using an input profile associating sets of first coordinate values of the first device-dependent color space with first sets of device-independent coordinate values of the profile connection space, respectively, and an output profile associating second sets of device-independent coordinate values of the profile connection space with sets of second coordinate values of the second device-dependent color space, respectively, and that associates the sets of the first coordinate values with sets of determined second coordinate values, respectively, which have been determined based on the first sets of device-independent coordinate values and the second sets of the device-independent coordinate values, the adjustment unit being configured to adjust the device link based on the adjustment target and a color conversion table including sets of device-independent coordinate values of the profile connection space of an original profile that is at least one of the input profile or the output profile, or both.

* * * * *